US011190564B2

(12) United States Patent
Stephenson

(10) Patent No.: US 11,190,564 B2
(45) Date of Patent: Nov. 30, 2021

(54) MULTIMEDIA CONTENT DISTRIBUTION SYSTEM AND METHOD

(71) Applicant: Sonos, Inc., Santa Barbara, CA (US)

(72) Inventor: Margot Stephenson, Los Angeles, CA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

(21) Appl. No.: 16/952,217

(22) Filed: Nov. 19, 2020

(65) Prior Publication Data

US 2021/0211477 A1    Jul. 8, 2021

Related U.S. Application Data

(63) Continuation of application No. 14/297,193, filed on Jun. 5, 2014.

(51) Int. Cl.
*H04L 29/06* (2006.01)
*G06Q 50/00* (2012.01)
*H04L 29/08* (2006.01)

(52) U.S. Cl.
CPC ............. *H04L 65/60* (2013.01); *G06Q 50/01* (2013.01); *H04L 67/1046* (2013.01); *H04L 67/1059* (2013.01)

(58) Field of Classification Search
CPC ................ H04L 65/60; H04L 67/1046; H04L 67/1059; G06Q 50/01
See application file for complete search history.

(56) References Cited

U.S. PATENT DOCUMENTS 4,296,278 A    10/1981  Cullison et al.
4,816,989 A    3/1989   Finn et al.
(Continued)

FOREIGN PATENT DOCUMENTS

CN    1818901 A    8/2006
CN    101410773 A   4/2009
(Continued)

OTHER PUBLICATIONS

International Searching Authority, International Search Report and Written Opinion dated Nov. 6, 2015, issued in connection with International Application No. PCT/US2015/051993, filed on Sep. 24, 2015, 10 pages.

(Continued)

*Primary Examiner* — Viet D Vu
(74) *Attorney, Agent, or Firm* — Akerman LLP

(57) ABSTRACT

A system that facilitates sharing of multimedia content includes a user interface, network circuitry; and one or more processors. The processors perform operations that include displaying, via the user interface, a list of one or more media playback devices available to be added to a social networking group. A selection of first and second media playback devices to be associated with a particular social networking group is received via the user interface. The first media playback device is associated with a first playback queue that specifies a first set of media items associated with first media content that can be streamed from a first streaming service to the first media playback device. An indication to the social networking system that specifies the selection of the first and second media playback devices to be associated with the group is communicated via the network circuitry. In response, the social networking system communicates second media content items associated with the first media content items to a second playback queue associated with the second media playback device. The second playback items facilitate streaming of second media content associated with the first media content from a second streaming service to the second media playback device.

19 Claims, 10 Drawing Sheets

(56) References Cited

U.S. PATENT DOCUMENTS

| | | |
|---|---|---|
| 5,182,552 A | 1/1993 | Paynting |
| 5,239,458 A | 8/1993 | Suzuki |
| 5,299,266 A | 3/1994 | Lumsden |
| 5,406,634 A | 4/1995 | Anderson et al. |
| 5,440,644 A | 8/1995 | Farinelli et al. |
| 5,467,342 A | 11/1995 | Logston et al. |
| 5,491,839 A | 2/1996 | Schotz |
| 5,553,222 A | 9/1996 | Milne et al. |
| 5,563,946 A | 10/1996 | Cooper et al. |
| 5,668,884 A | 9/1997 | Clair, Jr. et al. |
| 5,673,323 A | 9/1997 | Schotz et al. |
| 5,751,819 A | 5/1998 | Dorrough |
| 5,761,320 A | 6/1998 | Farinelli et al. |
| 5,774,666 A | 6/1998 | Portuesi |
| 5,808,662 A | 9/1998 | Kinney et al. |
| 5,815,689 A | 9/1998 | Shaw et al. |
| 5,856,827 A | 1/1999 | Sudo |
| 5,867,691 A | 2/1999 | Shiraishi |
| 5,875,354 A | 2/1999 | Charlton et al. |
| 5,887,143 A | 3/1999 | Saito et al. |
| 5,923,902 A | 7/1999 | Inagaki |
| 5,946,343 A | 8/1999 | Schotz et al. |
| 5,956,088 A | 9/1999 | Shen et al. |
| 6,002,862 A | 12/1999 | Takaike |
| 6,009,457 A | 12/1999 | Moller |
| 6,026,150 A | 2/2000 | Frank et al. |
| 6,031,818 A | 2/2000 | Lo et al. |
| 6,032,202 A | 2/2000 | Lea et al. |
| 6,108,686 A | 8/2000 | Williams, Jr. |
| 6,128,318 A | 10/2000 | Sato |
| 6,157,957 A | 12/2000 | Berthaud |
| 6,175,872 B1 | 1/2001 | Neumann et al. |
| 6,181,316 B1 | 1/2001 | Little et al. |
| 6,185,737 B1 | 2/2001 | Northcutt et al. |
| 6,195,436 B1 | 2/2001 | Scibora et al. |
| 6,199,169 B1 | 3/2001 | Voth |
| 6,255,961 B1 | 7/2001 | Van et al. |
| 6,256,554 B1 | 7/2001 | Dilorenzo |
| 6,308,207 B1 | 10/2001 | Tseng et al. |
| 6,324,586 B1 | 11/2001 | Johnson |
| 6,332,147 B1 | 12/2001 | Moran et al. |
| 6,349,339 B1 | 2/2002 | Williams |
| 6,351,821 B1 | 2/2002 | Voth |
| 6,404,811 B1 | 6/2002 | Cvetko et al. |
| 6,430,353 B1 | 8/2002 | Honda et al. |
| 6,469,633 B1 | 10/2002 | Wachter et al. |
| 6,487,296 B1 | 11/2002 | Allen et al. |
| 6,522,886 B1 | 2/2003 | Youngs et al. |
| 6,526,325 B1 | 2/2003 | Sussman et al. |
| 6,587,127 B1 | 7/2003 | Leeke et al. |
| 6,594,691 B1 | 7/2003 | McCollum et al. |
| 6,598,172 B1 | 7/2003 | Vandeusen et al. |
| 6,611,537 B1 | 8/2003 | Edens et al. |
| 6,631,410 B1 | 10/2003 | Kowalski et al. |
| 6,674,803 B1 | 1/2004 | Kesselring |
| 6,728,531 B1 | 4/2004 | Lee et al. |
| 6,732,155 B2 | 5/2004 | Meek |
| 6,757,517 B2 | 6/2004 | Chang |
| 6,778,869 B2 | 8/2004 | Champion |
| 6,826,283 B1 | 11/2004 | Wheeler et al. |
| 6,836,788 B2 | 12/2004 | Kim et al. |
| 6,898,642 B2 | 5/2005 | Chafle et al. |
| 6,912,610 B2 | 6/2005 | Spencer |
| 6,920,373 B2 | 7/2005 | Xi et al. |
| 6,934,766 B1 | 8/2005 | Russell |
| 6,985,694 B1 | 1/2006 | De Bonet et al. |
| 7,007,106 B1 | 2/2006 | Flood et al. |
| 7,017,118 B1 | 3/2006 | Carroll |
| 7,020,048 B2 | 3/2006 | McComas |
| 7,020,791 B1 | 3/2006 | Aweya et al. |
| 7,043,651 B2 | 5/2006 | Aweya et al. |
| 7,047,308 B2 | 5/2006 | Deshpande |
| 7,113,833 B1 | 9/2006 | Brown et al. |
| 7,113,999 B2 | 9/2006 | Pestoni et al. |
| 7,115,017 B1 | 10/2006 | Laursen et al. |
| 7,117,451 B2 | 10/2006 | Sielken |
| 7,124,125 B2 | 10/2006 | Cook et al. |
| 7,130,608 B2 | 10/2006 | Hollstrom et al. |
| 7,130,616 B2 | 10/2006 | Janik |
| 7,143,141 B1 | 11/2006 | Morgan et al. |
| 7,143,939 B2 | 12/2006 | Henzerling |
| 7,162,315 B2 | 1/2007 | Gilbert |
| 7,185,090 B2 | 2/2007 | Kowalski et al. |
| 7,187,947 B1 | 3/2007 | White et al. |
| 7,206,367 B1 | 4/2007 | Moore |
| 7,209,795 B2 | 4/2007 | Sullivan et al. |
| 7,218,708 B2 | 5/2007 | Berezowski et al. |
| 7,236,739 B2 | 6/2007 | Chang |
| 7,236,773 B2 | 6/2007 | Thomas |
| 7,281,034 B1 | 10/2007 | Eyal |
| 7,293,060 B2 | 11/2007 | Komsi |
| 7,295,548 B2 | 11/2007 | Blank et al. |
| 7,302,468 B2 | 11/2007 | Wijeratne |
| 7,312,785 B2 | 12/2007 | Tsuk et al. |
| 7,324,857 B2 | 1/2008 | Goddard |
| 7,333,519 B2 | 2/2008 | Sullivan et al. |
| 7,358,960 B2 | 4/2008 | Mak |
| 7,372,846 B2 | 5/2008 | Zwack |
| 7,391,791 B2 | 6/2008 | Balassanian et al. |
| 7,392,102 B2 | 6/2008 | Sullivan et al. |
| 7,483,538 B2 | 1/2009 | McCarty et al. |
| 7,483,958 B1 | 1/2009 | Elabbady et al. |
| 7,496,623 B2 | 2/2009 | Szeto et al. |
| 7,496,633 B2 | 2/2009 | Szeto et al. |
| 7,571,014 B1 | 8/2009 | Lambourne et al. |
| 7,574,274 B2 | 8/2009 | Holmes |
| 7,599,685 B2 | 10/2009 | Goldberg et al. |
| 7,630,501 B2 | 12/2009 | Blank et al. |
| 7,643,894 B2 | 1/2010 | Braithwaite et al. |
| 7,657,224 B2 | 2/2010 | Goldberg et al. |
| 7,657,644 B1 | 2/2010 | Zheng |
| 7,657,910 B1 | 2/2010 | Mcaulay et al. |
| 7,668,990 B2 | 2/2010 | Krzyzanowski et al. |
| 7,669,219 B2 | 2/2010 | Scott, III et al. |
| 7,675,943 B2 | 3/2010 | Mosig et al. |
| 7,676,142 B1 | 3/2010 | Hung |
| 7,702,279 B2 | 4/2010 | Ko et al. |
| 7,720,096 B2 | 5/2010 | Klemets |
| 7,725,533 B2 | 5/2010 | Szeto et al. |
| 7,725,551 B2 | 5/2010 | Szeto et al. |
| 7,739,271 B2 | 6/2010 | Cook et al. |
| 7,742,740 B2 | 6/2010 | Goldberg et al. |
| 7,788,138 B2 | 8/2010 | Viehmann et al. |
| 7,805,682 B1 | 9/2010 | Lambourne |
| 7,835,689 B2 | 11/2010 | Goldberg et al. |
| 7,853,341 B2 | 12/2010 | McCarty et al. |
| 7,865,137 B2 | 1/2011 | Goldberg et al. |
| 7,885,622 B2 | 2/2011 | Krampf et al. |
| 7,916,877 B2 | 3/2011 | Goldberg et al. |
| 7,917,082 B2 | 3/2011 | Goldberg et al. |
| 7,921,369 B2 | 4/2011 | Bill |
| 7,934,239 B1 | 4/2011 | Dagman |
| 7,987,294 B2 | 7/2011 | Bryce et al. |
| 7,996,566 B1 | 8/2011 | Sylvain et al. |
| 8,014,423 B2 | 9/2011 | Thaler et al. |
| 8,023,663 B2 | 9/2011 | Goldberg |
| 8,028,038 B2 | 9/2011 | Weel |
| 8,028,323 B2 | 9/2011 | Weel |
| 8,045,952 B2 | 10/2011 | Qureshey et al. |
| 8,050,652 B2 | 11/2011 | Qureshey et al. |
| 8,074,253 B1 | 12/2011 | Nathan |
| 8,086,752 B2 | 12/2011 | Millington et al. |
| 8,103,009 B2 | 1/2012 | McCarty et al. |
| 8,112,032 B2 | 2/2012 | Ko et al. |
| 8,131,390 B2 | 3/2012 | Braithwaite et al. |
| 8,169,938 B2 | 5/2012 | Duchscher et al. |
| 8,200,602 B2 | 6/2012 | Farrelly |
| 8,214,873 B2 | 7/2012 | Weel |
| 8,230,099 B2 | 7/2012 | Weel |
| 8,234,395 B2 | 7/2012 | Millington |
| 8,271,115 B2 | 9/2012 | Yoshida |
| 8,290,603 B1 | 10/2012 | Lambourne |
| 8,315,555 B2 | 11/2012 | Ko et al. |
| 8,370,678 B2 | 2/2013 | Millington et al. |

(56) References Cited

U.S. PATENT DOCUMENTS

| | | |
|---|---|---|
| 8,423,659 B2 | 4/2013 | Millington |
| 8,483,853 B1 | 7/2013 | Lambourne |
| 8,521,316 B2 | 8/2013 | Louboutin |
| 8,588,949 B2 | 11/2013 | Lambourne et al. |
| 8,613,385 B1 | 12/2013 | Hulet et al. |
| 8,666,826 B2 | 3/2014 | Narayanan et al. |
| 8,775,546 B2 | 7/2014 | Millington |
| 8,826,135 B1 | 9/2014 | Durham et al. |
| 8,843,500 B2 | 9/2014 | Nogues et al. |
| 8,892,648 B1 | 11/2014 | Durham et al. |
| 8,910,265 B2 | 12/2014 | Lang et al. |
| 8,942,252 B2 | 1/2015 | Balassanian et al. |
| 8,990,701 B2 | 3/2015 | Olofsson |
| 9,052,810 B2 | 6/2015 | Reimann et al. |
| 9,137,564 B2 | 9/2015 | Reimann |
| 9,165,255 B1 | 10/2015 | Shetty et al. |
| 9,229,938 B1 | 1/2016 | Jaini et al. |
| 9,246,866 B1 | 1/2016 | Sanders |
| 9,247,363 B2 | 1/2016 | Triplett et al. |
| 9,286,384 B2 | 3/2016 | Kuper et al. |
| 9,344,292 B2 | 5/2016 | Griffiths et al. |
| 9,374,607 B2 | 6/2016 | Bates et al. |
| 9,478,247 B2 | 10/2016 | Chen et al. |
| 9,489,383 B2 | 11/2016 | Hyman et al. |
| 9,510,055 B2 | 11/2016 | Kuper et al. |
| 9,524,338 B2 | 12/2016 | Van et al. |
| 9,654,821 B2 | 5/2017 | Coburn, IV et al. |
| 9,665,339 B2 | 5/2017 | Reimann et al. |
| 9,674,587 B2 | 6/2017 | Triplett et al. |
| 9,680,960 B2 | 6/2017 | Chen et al. |
| 9,696,874 B2 | 7/2017 | Kulick et al. |
| 9,703,521 B2 | 7/2017 | Kumar et al. |
| 9,715,500 B2 | 7/2017 | Cue et al. |
| 9,727,219 B2 | 8/2017 | Kumar et al. |
| 9,756,092 B2 | 9/2017 | Zhang et al. |
| 9,892,118 B2 | 2/2018 | Kumar et al. |
| 9,942,335 B2 | 4/2018 | Schneider et al. |
| 9,977,561 B2 | 5/2018 | Bates et al. |
| 10,032,233 B2 | 7/2018 | Papakipos et al. |
| 10,129,599 B2 | 11/2018 | Van Der Heide |
| 10,157,033 B2 | 12/2018 | Millington |
| 10,275,135 B2 | 4/2019 | Coburn, IV et al. |
| 10,296,884 B2 | 5/2019 | Lang et al. |
| 10,469,897 B2 | 11/2019 | Reimann et al. |
| 10,683,352 B1 | 6/2020 | Kahvejian et al. |
| 2001/0009604 A1 | 7/2001 | Ando et al. |
| 2001/0022823 A1 | 9/2001 | Renaud |
| 2001/0032188 A1 | 10/2001 | Miyabe et al. |
| 2001/0042107 A1 | 11/2001 | Palm |
| 2002/0002039 A1 | 1/2002 | Qureshey et al. |
| 2002/0002562 A1 | 1/2002 | Moran et al. |
| 2002/0003548 A1 | 1/2002 | Krusche et al. |
| 2002/0022453 A1 | 2/2002 | Balog et al. |
| 2002/0026442 A1 | 2/2002 | Lipscomb et al. |
| 2002/0034374 A1 | 3/2002 | Barton |
| 2002/0042844 A1 | 4/2002 | Chiazzese |
| 2002/0049843 A1 | 4/2002 | Barone et al. |
| 2002/0054134 A1 | 5/2002 | Kelts et al. |
| 2002/0056117 A1 | 5/2002 | Hasegawa et al. |
| 2002/0065926 A1 | 5/2002 | Hackney et al. |
| 2002/0072816 A1 | 6/2002 | Shdema et al. |
| 2002/0073228 A1 | 6/2002 | Cognet et al. |
| 2002/0090914 A1 | 7/2002 | Kang et al. |
| 2002/0093478 A1 | 7/2002 | Yeh |
| 2002/0109710 A1 | 8/2002 | Holtz et al. |
| 2002/0112244 A1 | 8/2002 | Liou et al. |
| 2002/0116476 A1 | 8/2002 | Eyal et al. |
| 2002/0124097 A1 | 9/2002 | Isely et al. |
| 2002/0129156 A1 | 9/2002 | Yoshikawa |
| 2002/0143998 A1 | 10/2002 | Rajagopal et al. |
| 2002/0163361 A1 | 11/2002 | Parkin |
| 2002/0165921 A1 | 11/2002 | Sapieyevski |
| 2002/0178191 A1 | 11/2002 | Sielken |
| 2002/0188762 A1 | 12/2002 | Tomassei et al. |
| 2003/0002609 A1 | 1/2003 | Faller et al. |
| 2003/0020763 A1 | 1/2003 | Mayer et al. |
| 2003/0023741 A1 | 1/2003 | Tomassetti et al. |
| 2003/0035444 A1 | 2/2003 | Zwack |
| 2003/0041173 A1 | 2/2003 | Hoyle |
| 2003/0041174 A1 | 2/2003 | Wen et al. |
| 2003/0043924 A1 | 3/2003 | Haddad et al. |
| 2003/0066094 A1 | 4/2003 | Van Der Schaar et al. |
| 2003/0088875 A1 | 5/2003 | Gay et al. |
| 2003/0099212 A1 | 5/2003 | Anjum et al. |
| 2003/0099221 A1 | 5/2003 | Rhee |
| 2003/0105820 A1 | 6/2003 | Haims et al. |
| 2003/0126211 A1 | 7/2003 | Anttila et al. |
| 2003/0157951 A1 | 8/2003 | Hasty |
| 2003/0195964 A1 | 10/2003 | Mane |
| 2003/0198257 A1 | 10/2003 | Sullivan et al. |
| 2003/0210796 A1 | 11/2003 | McCarty et al. |
| 2003/0220973 A1 | 11/2003 | Zhu et al. |
| 2003/0231871 A1 | 12/2003 | Ushimaru |
| 2003/0235304 A1 | 12/2003 | Evans et al. |
| 2004/0001484 A1 | 1/2004 | Ozguner |
| 2004/0001591 A1 | 1/2004 | Mani et al. |
| 2004/0008852 A1 | 1/2004 | Also et al. |
| 2004/0010727 A1 | 1/2004 | Fujinami |
| 2004/0015252 A1 | 1/2004 | Aiso et al. |
| 2004/0024478 A1 | 2/2004 | Hans et al. |
| 2004/0024925 A1 | 2/2004 | Cypher et al. |
| 2004/0025185 A1 | 2/2004 | Goci et al. |
| 2004/0027166 A1 | 2/2004 | Mangum et al. |
| 2004/0032348 A1 | 2/2004 | Lai et al. |
| 2004/0066736 A1 | 4/2004 | Kroeger |
| 2004/0075767 A1 | 4/2004 | Neuman et al. |
| 2004/0078383 A1 | 4/2004 | Mercer et al. |
| 2004/0078812 A1 | 4/2004 | Calvert |
| 2004/0088328 A1 | 5/2004 | Cook et al. |
| 2004/0131192 A1 | 7/2004 | Metcalf |
| 2004/0170383 A1 | 9/2004 | Mazur |
| 2004/0203378 A1 | 10/2004 | Powers |
| 2004/0215611 A1 | 10/2004 | Jawa et al. |
| 2004/0249965 A1 | 12/2004 | Huggins et al. |
| 2004/0249982 A1 | 12/2004 | Arnold et al. |
| 2004/0252400 A1 | 12/2004 | Blank et al. |
| 2004/0261040 A1 | 12/2004 | Radcliffe et al. |
| 2005/0010691 A1 | 1/2005 | Oyadomari et al. |
| 2005/0013394 A1 | 1/2005 | Rausch et al. |
| 2005/0021590 A1 | 1/2005 | Debique et al. |
| 2005/0047605 A1 | 3/2005 | Lee et al. |
| 2005/0058149 A1 | 3/2005 | Howe |
| 2005/0081213 A1 | 4/2005 | Suzuoki et al. |
| 2005/0108320 A1 | 5/2005 | Lord et al. |
| 2005/0114538 A1 | 5/2005 | Rose |
| 2005/0125357 A1 | 6/2005 | Saadat et al. |
| 2005/0155072 A1 | 7/2005 | Kaczowka et al. |
| 2005/0166157 A1 | 7/2005 | Ollis et al. |
| 2005/0166258 A1 | 7/2005 | Vasilevsky |
| 2005/0177643 A1 | 8/2005 | Xu |
| 2005/0181348 A1 | 8/2005 | Carey et al. |
| 2005/0195205 A1 | 9/2005 | Abrams |
| 2005/0201254 A1 | 9/2005 | Looney et al. |
| 2005/0234875 A1 | 10/2005 | Auerbach et al. |
| 2005/0281255 A1 | 12/2005 | Davies et al. |
| 2005/0283820 A1 | 12/2005 | Richards et al. |
| 2005/0288805 A1 | 12/2005 | Moore et al. |
| 2005/0289224 A1 | 12/2005 | Deslippe et al. |
| 2006/0095516 A1 | 5/2006 | Wijeratne |
| 2006/0107237 A1 | 5/2006 | Kim |
| 2006/0119497 A1 | 6/2006 | Miller et al. |
| 2006/0143236 A1 | 6/2006 | Wu |
| 2006/0168340 A1 | 7/2006 | Heller et al. |
| 2006/0195462 A1 | 8/2006 | Rogers |
| 2006/0195479 A1 | 8/2006 | Spiegelman et al. |
| 2006/0195480 A1 | 8/2006 | Spiegelman et al. |
| 2006/0253436 A1 | 11/2006 | Cook et al. |
| 2006/0253782 A1 | 11/2006 | Stark et al. |
| 2006/0294074 A1 | 12/2006 | Chang |
| 2007/0033402 A1 | 2/2007 | Williams et al. |
| 2007/0038999 A1 | 2/2007 | Millington |
| 2007/0043847 A1 | 2/2007 | Carter et al. |
| 2007/0048713 A1 | 3/2007 | Plastina et al. |
| 2007/0049256 A1 | 3/2007 | Wassingbo |

(56) References Cited

U.S. PATENT DOCUMENTS

| | | |
|---|---|---|
| 2007/0054680 A1 | 3/2007 | Mo et al. |
| 2007/0088747 A1 | 4/2007 | Cheng et al. |
| 2007/0136778 A1 | 6/2007 | Birger et al. |
| 2007/0142022 A1 | 6/2007 | Madonna et al. |
| 2007/0142944 A1 | 6/2007 | Goldberg et al. |
| 2007/0143493 A1 | 6/2007 | Mullig et al. |
| 2007/0156883 A1 | 7/2007 | Thompson et al. |
| 2007/0169115 A1 | 7/2007 | Ko et al. |
| 2007/0180137 A1 | 8/2007 | Rajapakse |
| 2007/0214182 A1 | 9/2007 | Rosenberg |
| 2007/0224937 A1 | 9/2007 | Jung et al. |
| 2007/0271232 A1 | 11/2007 | Mattox et al. |
| 2007/0271388 A1 | 11/2007 | Bowra et al. |
| 2007/0288470 A1 | 12/2007 | Kauniskangas et al. |
| 2007/0294131 A1 | 12/2007 | Roman et al. |
| 2007/0299778 A1 | 12/2007 | Haveson et al. |
| 2008/0005690 A1 | 1/2008 | Van Vugt |
| 2008/0016465 A1 | 1/2008 | Foxenland |
| 2008/0022320 A1 | 1/2008 | Ver Steeg |
| 2008/0052371 A1 | 2/2008 | Partovi et al. |
| 2008/0059510 A1 | 3/2008 | Cardamore et al. |
| 2008/0077261 A1 | 3/2008 | Baudino et al. |
| 2008/0086368 A1 | 4/2008 | Bauman et al. |
| 2008/0091771 A1 | 4/2008 | Allen et al. |
| 2008/0109529 A1 | 5/2008 | Story |
| 2008/0120429 A1 | 5/2008 | Millington et al. |
| 2008/0144861 A1 | 6/2008 | Melanson et al. |
| 2008/0152165 A1 | 6/2008 | Zacchi |
| 2008/0154959 A1 | 6/2008 | Dunko |
| 2008/0194276 A1 | 8/2008 | Lin et al. |
| 2008/0301280 A1 | 12/2008 | Chasen et al. |
| 2008/0319833 A1 | 12/2008 | Svendsen |
| 2009/0005893 A1 | 1/2009 | Sugii et al. |
| 2009/0031336 A1 | 1/2009 | Chavez et al. |
| 2009/0041423 A1 | 2/2009 | Weber et al. |
| 2009/0063414 A1 | 3/2009 | White et al. |
| 2009/0076881 A1 | 3/2009 | Svendsen |
| 2009/0076917 A1 | 3/2009 | Jablokov et al. |
| 2009/0083117 A1 | 3/2009 | Svendsen et al. |
| 2009/0133069 A1 | 5/2009 | Conness et al. |
| 2009/0150806 A1 | 6/2009 | Evje et al. |
| 2009/0157905 A1 | 6/2009 | Davis |
| 2009/0175429 A1 | 7/2009 | Cohen et al. |
| 2009/0179867 A1 | 7/2009 | Shim et al. |
| 2009/0216855 A1 | 8/2009 | Lang et al. |
| 2009/0222115 A1 | 9/2009 | Malcolm et al. |
| 2009/0228919 A1 | 9/2009 | Zott et al. |
| 2009/0249222 A1 | 10/2009 | Schmidt et al. |
| 2009/0265426 A1 | 10/2009 | Svendsen et al. |
| 2009/0307062 A1 | 12/2009 | Lutnick et al. |
| 2009/0313369 A1 | 12/2009 | Wormington et al. |
| 2010/0010648 A1 | 1/2010 | Bull et al. |
| 2010/0017366 A1 | 1/2010 | Robertson et al. |
| 2010/0017714 A1 | 1/2010 | Agarwal et al. |
| 2010/0023578 A1 | 1/2010 | Brant et al. |
| 2010/0031366 A1 | 2/2010 | Knight et al. |
| 2010/0036950 A1 | 2/2010 | Bae et al. |
| 2010/0049835 A1 | 2/2010 | Ko et al. |
| 2010/0054275 A1 | 3/2010 | Noonan et al. |
| 2010/0082731 A1 | 4/2010 | Haughay et al. |
| 2010/0094834 A1 | 4/2010 | Svendsen et al. |
| 2010/0095332 A1 | 4/2010 | Gran et al. |
| 2010/0131567 A1 | 5/2010 | Dorogusker et al. |
| 2010/0162324 A1 | 6/2010 | Mehta et al. |
| 2010/0205222 A1 | 8/2010 | Gajdos et al. |
| 2010/0228740 A1 | 9/2010 | Cannistraro et al. |
| 2010/0235520 A1 | 9/2010 | Attanasio et al. |
| 2010/0262909 A1 | 10/2010 | Hsieh |
| 2010/0284389 A1 | 11/2010 | Ramsay et al. |
| 2010/0299391 A1 | 11/2010 | Demarta et al. |
| 2010/0299639 A1 | 11/2010 | Ramsay et al. |
| 2010/0318917 A1 | 12/2010 | Holladay et al. |
| 2010/0325218 A1 | 12/2010 | Castro et al. |
| 2010/0332326 A1 | 12/2010 | Ishai |
| 2011/0004330 A1 | 1/2011 | Rothkopf et al. |
| 2011/0041080 A1 | 2/2011 | Fleischman et al. |
| 2011/0066941 A1 | 3/2011 | Chipchase et al. |
| 2011/0066943 A1 | 3/2011 | Brillon et al. |
| 2011/0087842 A1 | 4/2011 | Lu et al. |
| 2011/0119706 A1 | 5/2011 | Scott et al. |
| 2011/0154173 A1 | 6/2011 | Herlein |
| 2011/0196888 A1 | 8/2011 | Hanson et al. |
| 2011/0202430 A1 | 8/2011 | Narayanan et al. |
| 2011/0202842 A1 | 8/2011 | Weatherly et al. |
| 2011/0211534 A1 | 9/2011 | Schmidt et al. |
| 2011/0225417 A1 | 9/2011 | Maharajh et al. |
| 2011/0238755 A1 | 9/2011 | Khan et al. |
| 2011/0246383 A1 | 10/2011 | Gibson et al. |
| 2011/0264732 A1 | 10/2011 | Robbin et al. |
| 2011/0314388 A1 | 12/2011 | Wheatley |
| 2012/0029671 A1 | 2/2012 | Millington et al. |
| 2012/0030366 A1 | 2/2012 | Collart et al. |
| 2012/0054278 A1 | 3/2012 | Taleb et al. |
| 2012/0059495 A1 | 3/2012 | Weiss et al. |
| 2012/0060046 A1 | 3/2012 | Millington |
| 2012/0071996 A1 | 3/2012 | Svendsen |
| 2012/0096526 A1 | 4/2012 | Brahmanapalli et al. |
| 2012/0117168 A1 | 5/2012 | Sugiyama et al. |
| 2012/0117185 A1 | 5/2012 | Cassidy |
| 2012/0117586 A1 | 5/2012 | McCoy et al. |
| 2012/0124176 A1 | 5/2012 | Curtis et al. |
| 2012/0129446 A1 | 5/2012 | Ko et al. |
| 2012/0151320 A1 | 6/2012 | McClements, IV |
| 2012/0158531 A1 | 6/2012 | Dion et al. |
| 2012/0159393 A1 | 6/2012 | Sethi |
| 2012/0206623 A1 | 8/2012 | Nakama |
| 2012/0210205 A1 | 8/2012 | Sherwood et al. |
| 2012/0221951 A1 | 8/2012 | Kidron |
| 2012/0233067 A1 | 9/2012 | Matthew et al. |
| 2012/0233639 A1 | 9/2012 | Zott et al. |
| 2012/0272156 A1 | 10/2012 | Kerger et al. |
| 2012/0284423 A1 | 11/2012 | Weel et al. |
| 2012/0311635 A1 | 12/2012 | Mushkatblat et al. |
| 2012/0315884 A1 | 12/2012 | Forutanpour et al. |
| 2012/0331386 A1 | 12/2012 | Hicken et al. |
| 2013/0007617 A1 | 1/2013 | MacKenzie |
| 2013/0024880 A1 | 1/2013 | Moloney-Egnatios et al. |
| 2013/0031162 A1 | 1/2013 | Willis et al. |
| 2013/0061296 A1 | 3/2013 | Reddy et al. |
| 2013/0070093 A1 | 3/2013 | Rivera et al. |
| 2013/0073584 A1 | 3/2013 | Kuper et al. |
| 2013/0073979 A1 | 3/2013 | Shepherd et al. |
| 2013/0080599 A1 | 3/2013 | Ko et al. |
| 2013/0080955 A1 | 3/2013 | Reimann et al. |
| 2013/0081110 A1 | 3/2013 | McGowan |
| 2013/0128038 A1 | 5/2013 | Cok et al. |
| 2013/0129232 A1 | 5/2013 | Cok et al. |
| 2013/0130729 A1 | 5/2013 | Cok et al. |
| 2013/0159858 A1 | 6/2013 | Joffray et al. |
| 2013/0166649 A1 | 6/2013 | Atzmon et al. |
| 2013/0173531 A1 | 7/2013 | Rinearson et al. |
| 2013/0173794 A1 | 7/2013 | Agerbak et al. |
| 2013/0174204 A1 | 7/2013 | Coburn, IV et al. |
| 2013/0191454 A1 | 7/2013 | Oliver et al. |
| 2013/0198633 A1 | 8/2013 | Hyman |
| 2013/0221951 A1 | 8/2013 | Anderson et al. |
| 2013/0246522 A1 | 9/2013 | Bilinski et al. |
| 2013/0297686 A1 | 11/2013 | Bilinski et al. |
| 2013/0310316 A1 | 11/2013 | Hellstrom et al. |
| 2013/0339397 A1 | 12/2013 | Herasymchuk |
| 2013/0339589 A1 | 12/2013 | Qawami et al. |
| 2013/0343567 A1 | 12/2013 | Triplett et al. |
| 2013/0346859 A1 | 12/2013 | Bates et al. |
| 2014/0025688 A1 | 1/2014 | Andler et al. |
| 2014/0047074 A1 | 2/2014 | Chung et al. |
| 2014/0052770 A1 | 2/2014 | Gran et al. |
| 2014/0059431 A1 | 2/2014 | Svendsen et al. |
| 2014/0067828 A1* | 3/2014 | Archibong ........ G06F 17/30277 707/748 |
| 2014/0067998 A1 | 3/2014 | Garcia et al. |
| 2014/0075308 A1 | 3/2014 | Sanders et al. |
| 2014/0075316 A1 | 3/2014 | Li |
| 2014/0081796 A1 | 3/2014 | Cohen |
| 2014/0093219 A1 | 4/2014 | Trivedi |

(56) References Cited

U.S. PATENT DOCUMENTS

| | | | |
|---|---|---|---|
| 2014/0108528 A1 | 4/2014 | Papakipos et al. | |
| 2014/0115061 A1 | 4/2014 | Reddy et al. | |
| 2014/0122590 A1 | 5/2014 | Svendsen | |
| 2014/0146982 A1 | 5/2014 | Pelosi | |
| 2014/0201632 A1 | 7/2014 | Kunigita et al. | |
| 2014/0204076 A1 | 7/2014 | Kuper et al. | |
| 2014/0208205 A1 | 7/2014 | Bartholomew | |
| 2014/0223099 A1 | 8/2014 | Kidron | |
| 2014/0237361 A1 | 8/2014 | Martin et al. | |
| 2014/0244863 A1 | 8/2014 | Bradley et al. | |
| 2014/0310058 A1 | 10/2014 | Aral et al. | |
| 2014/0310779 A1 | 10/2014 | Lof et al. | |
| 2014/0330951 A1 | 11/2014 | Sukoff et al. | |
| 2014/0337959 A1 | 11/2014 | Garmark et al. | |
| 2014/0341528 A1 | 11/2014 | Mahate et al. | |
| 2014/0359680 A1 | 12/2014 | Shivadas et al. | |
| 2015/0039620 A1 | 2/2015 | Ning | |
| 2015/0046458 A1 | 2/2015 | Hu | |
| 2015/0066892 A1 | 3/2015 | Astore | |
| 2015/0067054 A1 | 3/2015 | Yoo et al. | |
| 2015/0067871 A1 | 3/2015 | Commons et al. | |
| 2015/0074534 A1 | 3/2015 | Didomenico et al. | |
| 2015/0095680 A1 | 4/2015 | Gossain et al. | |
| 2015/0113058 A1 | 4/2015 | Zhang et al. | |
| 2015/0121220 A1 | 4/2015 | Lee et al. | |
| 2015/0128162 A1 | 5/2015 | Ionescu et al. | |
| 2015/0185599 A1 | 7/2015 | Mullins | |
| 2015/0186110 A1 | 7/2015 | Kannan | |
| 2015/0220498 A1 | 8/2015 | Munoz et al. | |
| 2015/0286360 A1 | 10/2015 | Wachter | |
| 2015/0331940 A1 | 11/2015 | Manning | |
| 2016/0063011 A1 | 3/2016 | Wehbi et al. | |
| 2016/0077710 A1* | 3/2016 | Lewis | G06F 3/011 715/716 |
| 2016/0082348 A1 | 3/2016 | Kehoe et al. | |
| 2016/0147501 A1 | 5/2016 | Gilbert | |
| 2016/0180248 A1 | 6/2016 | Regan | |
| 2016/0253145 A1 | 9/2016 | Lee et al. | |
| 2017/0093943 A1* | 3/2017 | Alsina | H04L 67/1095 |
| 2017/0161119 A1 | 6/2017 | Boyle et al. | |
| 2017/0169522 A1 | 6/2017 | Hyman et al. | |
| 2017/0236512 A1 | 8/2017 | Williams et al. | |

FOREIGN PATENT DOCUMENTS

| | | |
|---|---|---|
| CN | 101427316 A | 5/2009 |
| CN | 101714156 A | 5/2010 |
| CN | 101910992 A | 12/2010 |
| CN | 102450032 A | 5/2012 |
| CN | 102656898 A | 9/2012 |
| CN | 102947827 A | 2/2013 |
| CN | 104126309 A | 10/2014 |
| EP | 0251584 A2 | 1/1988 |
| EP | 0672985 A1 | 9/1995 |
| EP | 1111527 A2 | 6/2001 |
| EP | 1389853 A1 | 2/2004 |
| JP | 2004354721 A | 12/2004 |
| JP | 2007520808 A | 7/2007 |
| JP | 2009540638 A | 11/2009 |
| JP | 2010141748 A | 6/2010 |
| JP | 2011128957 | 6/2011 |
| JP | 2011223124 A | 11/2011 |
| KR | 20010090215 | 10/2001 |
| KR | 20050051785 | 6/2005 |
| KR | 1020070040592 | 4/2007 |
| KR | 20070048922 | 5/2007 |
| KR | 100890993 | 3/2009 |
| KR | 20100060498 A | 6/2010 |
| KR | 20100071724 | 6/2010 |
| KR | 20100134164 | 12/2010 |
| KR | 20110064635 | 6/2011 |
| KR | 20130083012 A | 7/2013 |
| WO | 199525313 | 9/1995 |
| WO | 199961985 | 12/1999 |
| WO | 200147248 | 6/2001 |
| WO | 200153994 | 7/2001 |
| WO | 02052540 A1 | 7/2002 |
| WO | 2002052540 | 7/2002 |
| WO | 2003093950 A2 | 11/2003 |
| WO | 2005013047 A2 | 2/2005 |
| WO | 2005079071 A1 | 8/2005 |
| WO | 2007023120 A1 | 3/2007 |
| WO | 2010018429 A1 | 2/2010 |
| WO | 2011100264 A3 | 11/2011 |
| WO | 2011157891 A1 | 12/2011 |
| WO | 2012050927 A2 | 4/2012 |
| WO | 2012056326 A2 | 5/2012 |
| WO | 2012106269 | 8/2012 |
| WO | 2012170205 A1 | 12/2012 |
| WO | 2013139239 A1 | 9/2013 |
| WO | 2014004181 | 1/2014 |
| WO | 2014116693 A1 | 7/2014 |
| WO | 2014145746 | 9/2014 |

OTHER PUBLICATIONS

International Searching Authority, International Search Report and Written Opinion dated Dec. 7, 2015, issued in connection with International Application No. PCT/US2015/051968, filed on Sep. 24, 2015, 14 pages.

International Searching Authority, International Search Report and Written Opinion dated Dec. 16, 2015, issued in connection with International Application No. PCT/US2015/051989 filed on Sep. 24, 2015, 11 pages.

International Searching Authority, International Search Report and Written Opinion dated Dec. 21, 2015, issued in connection with International Application No. PCT/US2015/051983 filed on Sep. 24, 2015, 11 pages.

International Searching Authority, International Search Report and Written Opinion dated Nov. 23, 2015, issued in connection with International Application No. PCT/US2015/051975, filed on Sep. 24, 2015, 14 pages.

International Searching Authority, International Search Report and Written Opinion dated Apr. 24, 2015, issued in connection with International Application No. PCT/US2015/014156, filed on Feb. 3, 2015, 13 pages.

International Searching Authority, International Search Report and Written Opinion dated Aug. 27, 2015, issued in connection with International Application No. PCT/US2015/031934, filed on May 21, 2015, 14 pages.

International Searching Authority, International Search Report and Written Opinion dated Nov. 27, 2015, issued in connection with International Application No. PCT/US2015/044218, filed on Aug. 7, 2015, 13 pages.

International Searching Authority, International Search Report and Written Opinion dated May 29, 2015, issued in connection with International Application No. PCT/US2015/018850, filed on Mar. 5, 2015, 13 pages.

International Searching Authority, International Search Report dated May 8, 2014, issued in connection with International Application No. PCT/US2014/012534, filed on Jan. 24, 2014, 3 pages.

International Searching Authority, International Search Report dated Dec. 27, 2012, issued in connection with International Application No. PCT/US2012/047620, filed on Jul. 20, 2011, 3 pages.

International Searching Authority, Written Opinion dated Dec. 27, 2012, issued in connection with International Application No. PCT/US2012/047620, filed on Jul. 20, 2011, 5 pages.

International Searhing Authority, International Search Report and Written Opinion dated Feb. 28, 2013, issued in connection with International Application No. PCT/US2012/056467, filed on Sep. 21, 2012, 12 pages.

Ishibashi et al., "A Group Synchronization Mechanism for Live Media in Multicast Communications," IEEE Global Telecommunications Conference, 1997, pp. 746-752, vol. 2.

Ishibashi et al., "A Group Synchronization Mechanism for Stored Media in Multicast Communications," IEEE Information Revolution and Communications, 1997, pp. 692-700, vol. 2.

(56) References Cited

OTHER PUBLICATIONS

Japanese Patent Office, Full English Translation of Office Action dated Nov. 28, 2017, issued in connection with Japanese Patent Application No. 2016-555529, 2 pages.
Japanese Patent Office, Notice of Rejection dated Nov. 8, 2016, issued in connection with Japanese Application No. 2015-555237, 6 pages.
Japanese Patent Office, Office Action dated Nov. 28, 2017, issued in connection with Japanese Patent Application No. 2016-555529, 5 pages.
Japanese Patent Office, Office Action dated Nov. 7, 2017, issued in connection with Japanese Patent Application No. 2016-550231, 5 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Mills David L., "Network Time Protocol (Version 3) Specification, Implementation and Analysis," Network Working Group, Mar. 1992, 7 pages.
Mills, David L., "Precision Synchronization of Computer Network Clocks," ACM SIGCOMM Computer Communication Review, 1994, pp. 28-43, vol. 24, No. 2.
Motorola, "Simplefi, Wireless Digital Audio Receiver, Installation and User Guide," Dec. 31, 2001, 111 pages.
Nilsson, M., "ID3 Tag Version 2," Mar. 26, 1998, 28 pages.
Non-Final Office Action dated Nov. 1, 2016, issued in connection with U.S. Appl. No. 14/173,253, filed Feb. 5, 2014, 21 pages.
Non-Final Office Action dated Oct. 1, 2015, issued in connection with U.S. Appl. No. 13/748,357, filed Jan. 23, 2013, 18 pages.
Non-Final Office Action dated Oct. 3, 2017, issued in connection with U.S. Appl. No. 14/495,633, filed Sep. 24, 2014, 18 pages.
Non-Final Office Action dated Apr. 6, 2016, issued in connection with U.S. Appl. No. 14/297,193, filed Jun. 5, 2014, 26 pages.
Non-Final Office Action dated May 6, 2015, issued in connection with U.S. Appl. No. 13/748,357, filed Jan. 23, 2013, 17 pages.
Non-Final Office Action dated Jul. 10, 2017, issued in connection with U.S. Appl. No. 14/297,193, filed Jun. 5, 2014, 33 pages.
Non-Final Office Action dated Sep. 10, 2015, issued in connection with U.S. Appl. No. 14/197,403, filed Mar. 5, 2014, 16 pages.
Non-Final Office Action dated Jan. 12, 2017, issued in connection with U.S. Appl. No. 14/275,112, filed May 12, 2014, 25 pages.
Non-Final Office Action dated Jan. 12, 2021, issued in connection with U.S. Appl. No. 16/952,217, filed Nov. 19, 2020, 8 pages.
Non-Final Office Action dated May 12, 2020, issued in connection with U.S. Appl. No. 16/516,767, filed Jul. 19, 2019, 12 pages.
Non-Final Office Action dated Mar. 13, 2020, issued in connection with U.S. Appl. No. 15/664,634, filed Jul. 31, 2017, 20 pages.
Non-Final Office Action dated Nov. 13, 2018, issued in connection with U.S. Appl. No. 16/143,301, filed Sep. 26, 2018, 27 pages.
Non-Final Office Action dated Jan. 14, 2020, issued in connection with U.S. Appl. No. 15/966,337, filed Apr. 30, 2018, 16 pages.
Non-Final Office Action dated Jun. 14, 2017, issued in connection with U.S. Appl. No. 14/495,659, filed Sep. 24, 2014, 15 pages.
Non-Final Office Action dated Feb. 16, 2021, issued in connection with U.S. Appl. No. 16/866,159, filed May 4, 2020, 10 pages.
Non-Final Office Action dated Jan. 16, 2019, issued in connection with U.S. Appl. No. 15/664,634, filed Jul. 31, 2017, 17 pages.
Non-Final Office Action dated Dec. 17, 2015, issued in connection with U.S. Appl. No. 14/173,253, filed Feb. 5, 2014, 18 pages.
Non-Final Office Action dated Jun. 17, 2016, issued in connection with U.S. Appl. No. 14/495,706, filed Sep. 24, 2014, 19 pages.
Non-Final Office Action dated May 18, 2016, issued in connection with U.S. Appl. No. 14/197,403, filed Mar. 5, 2014, 21 pages.

Non-Final Office Action dated Feb. 19, 2019, issued in connection with U.S. Appl. No. 15/966,337, filed Apr. 30, 2018, 14 pages.
Non-Final Office Action dated Mar. 19, 2019, issued in connection with U.S. Appl. No. 15/607,267, filed May 26, 2017, 18 pages.
Non-Final Office Action dated Jun. 21, 2018, issued in connection with U.S. Appl. No. 15/692,090, filed Aug. 31, 2017, 20 pages.
Non-Final Office Action dated Jan. 22, 2019, issued in connection with U.S. Appl. No. 16/174,703, filed Oct. 30, 2018, 15 pages.
Non-Final Office Action dated Mar. 23, 2018, issued in connection with U.S. Appl. No. 15/227,074, filed Aug. 3, 2016, 11 pages.
Advisory Action dated Feb. 1, 2017, issued in connection with U.S. Appl. No. 14/297,193, filed Jun. 5, 2014, 6 pages.
Advisory Action dated Feb. 3, 2017, issued in connection with U.S. Appl. No. 14/495,659, filed Sep. 24, 2014, 5 pages.
Advisory Action dated Sep. 11, 2019, issued in connection with U.S. Appl. No. 14/495,633, filed Sep. 24, 2014, 3 pages.
Advisory Action dated Jul. 12, 2016, issued in connection with U.S. Appl. No. 14/173,253, filed Feb. 5, 2014, 5 pages.
Advisory Action dated Mar. 19, 2019, issued in connection with U.S. Appl. No. 15/595,519, filed May 15, 2017, 3 pages.
Advisory Action dated Oct. 21, 2019, issued in connection with U.S. Appl. No. 15/664,634, filed Jul. 31, 2017, 4 pages.
Advisory Action dated Aug. 22, 2017, issued in connection with U.S. Appl. No. 14/173,253, filed Feb. 5, 2014, 4 pages.
Advisory Action dated Nov. 25, 2019, issued in connection with U.S. Appl. No. 15/607,267, filed May 26, 2017, 5 pages.
Advisory Action dated Oct. 25, 2019, issued in connection with U.S. Appl. No. 15/966,337, filed Apr. 30, 2018, 4 pages.
Advisory Action dated May 29, 2020, issued in connection with U.S. Appl. No. 15/595,519, filed May 15, 2017, 2 pages.
Advisory Action dated Mar. 8, 2021, issued in connection with U.S. Appl. No. 14/297,193, filed Jun. 5, 2014, 3 pages.
Akyildiz et al., "Multimedia Group Synchronization Protocols for Integrated Services Networks," IEEE Journal on Selected Areas in Communications, 1996 pp. 162-173, vol. 14, No. 1.
Anonymous: "Email Parser Tool—customizable email parsing software by ITG," May 17, 2014, [online] Retrieved from the Internet on Nov. 5, 2019: (URL:https//web.archive.org/web/20140517050139://emailparser.net/).
AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Benslimane Abderrahim, "A Multimedia Synchronization Protocol for Multicast Groups," Proceedings of the 26th Euromicro Conference, 2000, pp. 456-463, vol. 1.
Biersack et al., "Intra- and Inter-Stream Synchronization for Stored Multimedia Streams," IEEE International Conference on Multimedia Computing and Systems, 1996, pp. 372-381.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Bretl W.E., et al., MPEG2 Tutorial [online], 2000 [retrieved on Jan. 13, 2009] Retrieved from the Internet:(http://www.bretl.com/mpeghtml/MPEGindex.htm), pp. 1-23.
Chinese Patent Office, First Office Action and Translation dated Feb. 2, 2019, issued in connection with Chinese Application No. 201580011640.5, 12 pages.
Chinese Patent Office, First Office Action and Translation dated Aug. 26, 2020, issued in connection with Chinese Application No. 201910608857.4, 17 pages.
Chinese Patent Office, First Office Action dated Feb. 27, 2019, issued in connection with Chinese Application No. 201580007534.X, 9 pages.
Chinese Patent Office, First Office Action dated Sep. 4, 2017, issued in connection with Chinese Application No. 2014800172148.0, 16 pages.
Chinese Patent Office, Second Office Action dated Apr. 11, 2018, issued in connection with Chinese Application No. 201480017214.8, 7 pages.

(56) References Cited

OTHER PUBLICATIONS

Chinese Patent Office, Third Office Action dated Oct. 18, 2018, issued in connection with Chinese Application No. 2014800172148, 8 pages.
Corrected Notice of Allowability dated Jan. 19, 2017, issued in connection with U.S. Appl. No. 14/197,403, filed Mar. 5, 2014, 2 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, Decision to Refuse EP Application dated Oct. 16, 2018, issued in connection with European Application No. 157758970, 48 pages.
European Patent Office, Decision to Refuse EP Application dated Sep. 27, 2018, issued in connection with European Application No. 15781794.1, 54 pages.
European Patent Office, EP Supplemental Search dated Dec. 19, 2017, issued in connection with EP Application No. 15829058.5, 12 pages.
European Patent Office, European Extended Search Report dated Feb. 5, 2018, issued in connection with EP Application No. 15803430.6, 8 pages.
European Patent Office, European Office Action dated Nov. 13, 2019, issued in connection with European Application No. 15829058.5, 8 pages.
European Patent Office, European Office Action dated Jan. 2, 2019, issued in connection with European Application No. 15829058.5, 4 pages.
European Patent Office, European Office Action dated Aug. 3, 2017, issued in connection with EP Application No. 15781794.1, 6 pages.
European Patent Office, European Supplemental Search Report dated Sep. 18, 2017, issued in connection with EP Application No. 15829058.5, 13 pages.
European Patent Office, European Supplemental Search Report dated Jan. 27, 2016, issued in connection with European Application No. 14743335.3, 8 pages.
European Patent Office, Examination Report dated Feb. 3, 2017, issued in connection with European Patent Application No. 14743335.3, 5 pages.
European Patent Office, Extended European Search Report dated Mar. 15, 2017, issued in connection with European Application No. 15758460.8, 9 pages.
European Patent Office, Extended European Search Report dated Dec. 23, 2016, issued in connection with European Application No. 15746781.2, 10 pages.
European Patent Office, Office Action dated Mar. 2, 2017, issued in connection with European Application No. 15775566.1, 7 pages.
European Patent Office, Office Action dated Apr. 4, 2017, issued in connection with European Application No. 15775897.0, 6 pages.
European Patent Office, Office Action dated Jan. 13, 2017, issued in connection with European Application No. 15781794.1, 8 pages.
European Patent Office, Office Action dated Mar. 13, 2017, issued in connection with European Application No. 15781200.9, 5 pages.
European Patent Office, Summons to Attend Oral Proceedings mailed on Jun. 11, 2019, issued in connection with European Application No. 14743335.3, 10 pages.
European Patent Office, Summons to Attend Oral Proceedings mailed on Nov. 20, 2020, issued in connection with European Application No. 15829058.5, 7 pages.
European Patent Office, Summons to Attend Oral Proceedings dated Mar. 27, 2018, issued in connection with European Patent Application No. 15781794.1, 11 pages.
Final Office Action dated Nov. 2, 2017, issued in connection with U.S. Appl. No. 14/275,112, filed May 12, 2014, 20 pages.
Final Office Action dated Oct. 2, 2019, issued in connection with U.S. Appl. No. 14/297,193, filed Jun. 5, 2014, 47 pages.
Final Office Action dated Nov. 3, 2016, issued in connection with U.S. Appl. No. 14/495,684, filed Sep. 24, 2014, 16 pages.
Final Office Action dated Oct. 3, 2019, issued in connection with U.S. Appl. No. 16/174,703, filed Oct. 30, 2018, 17 pages.
Final Office Action dated Apr. 6, 2016, issued in connection with U.S. Appl. No. 14/173,253, filed Feb. 5, 2014, 20 pages.
Final Office Action dated Feb. 7, 2017, issued in connection with U.S. Appl. No. 14/455,651, filed Aug. 8, 2014, 22 pages.
Final Office Action dated Oct. 7, 2016, issued in connection with U.S. Appl. No. 14/495,595, filed Sep. 24, 2014, 16 pages.
Final Office Action dated Nov. 8, 2016, issued in connection with U.S. Appl. No. 14/495,659, filed Sep. 24, 2014,14 pages.
Final Office Action dated Feb. 10, 2016, issued in connection with U.S. Appl. No. 14/197,403, filed Mar. 5, 2014, 21 pages.
Final Office Action dated Feb. 11, 2020, issued in connection with U.S. Appl. No. 15/595,519, filed May 15, 2017, 15 pages.
Final Office Action dated Feb. 16, 2017, issued in connection with U.S. Appl. No. 14/495,633, filed Sep. 24, 2014, 15 pages.
Final Office Action dated Sep. 16, 2016, issued in connection with U.S. Appl. No. 14/275,112, filed May 12, 2014, 19 pages.
Final Office Action dated Jan. 19, 2018, issued in connection with U.S. Appl. No. 14/297,193, filed Jun. 5, 2014, 32 pages.
Final Office Action dated Jan. 2, 2019, issued in connection with U.S. Appl. No. 15/595,519, filed May 15, 2017, 14 pages.
Final Office Action dated Aug. 20, 2019, issued in connection with U.S. Appl. No. 15/607,267, filed May 26, 2017, 19 pages.
Final Office Action dated Oct. 20, 2016, issued in connection with U.S. Appl. No. 14/197,403, filed an Mar. 5, 2016, 17 pages.
Final Office Action dated Mar. 28, 2018, issued in connection with U.S. Appl. No. 14/495,633, filed Sep. 24, 2014, 21 pages.
Final Office Action dated Oct. 29, 2018, issued in connection with U.S. Appl. No. 15/607,267, filed May 26, 2017, 17 pages.
Final Office Action dated Sep. 3, 2020, issued in connection with U.S. Appl. No. 15/664,634, filed Jul. 31, 2017, 24 pages.
Final Office Action dated Sep. 30, 2016, issued in connection with U.S. Appl. No. 14/297,193, filed Jun. 5, 2014, 34 pages.
Final Office Action dated Dec. 31, 2020, issued in connection with U.S. Appl. No. 14/297,193, filed Jun. 5, 2014, 26 pages.
Final Office Action dated Jul. 31, 2019, issued in connection with U.S. Appl. No. 15/664,634, filed Jul. 31, 2017, 16 pages.
Final Office Action dated May 31, 2017, issued in connection with U.S. Appl. No. 14/173,253, filed Feb. 5, 2014, 22 pages.
Final Office Action dated May 31, 2017, issued in connection with U.S. Appl. No. 14/821,513, filed Aug. 7, 2015, 16 pages.
Final Office Action dated Jul. 5, 2019, issued in connection with U.S. Appl. No. 14/495,633, filed Sep. 24, 2014, 16 pages.
Final Office Action dated Jul. 5, 2019, issued in connection with U.S. Appl. No. 15/966,337, filed Apr. 30, 2018, 16 pages.
First Action Interview Office Action dated Apr. 4, 2016, issued in connection with U.S. Appl. No. 14/275,112, filed May 12, 2014, 8 pages.
First Action Interview Office Action dated Jul. 7, 2016, issued in connection with U.S. Appl. No. 14/495,595, filed Sep. 24, 2014, 6 pages.
First Action Interview Office Action dated Jul. 11, 2016, issued in connection with U.S. Appl. No. 14/495,684, filed Sep. 24, 2014, 8 pages.
First Action Interview Office Action dated Jul. 13, 2016, issued in connection with U.S. Appl. No. 14/455,651, filed Aug. 8, 2014, 10 pages.
First Action Interview Office Action dated Oct. 13, 2016, issued in connection with U.S. Appl. No. 14/495,633, filed Sep. 24, 2014, 8 pages.
First Action Interview Office Action dated Dec. 14, 2016, issued in connection with U.S. Appl. No. 14/821,513, filed Aug. 7, 2015, 10 pages.
First Action Interview Office Action dated Nov. 14, 2019, issued in connection with U.S. Appl. No. 16/188,186, filed Nov. 12, 2018, 14 pages.
First Action Interview Office Action dated Jan. 17, 2020, issued in connection with U.S. Appl. No. 16/188,186, filed Nov. 12, 2018, 14 pages.
First Action Interview Office Action dated Jul. 22, 2016, issued in connection with U.S. Appl. No. 14/495,659, filed Sep. 24, 2014, 8 pages.

(56) References Cited

OTHER PUBLICATIONS

First Action Interview Pilot Program Pre-Interview Communication dated Oct. 28, 2015, issued in connection with U.S. Appl. No. 14/275,112, filed May 12, 2014, 4 pages.
First Action Interview Pilot Program Pre-Interview Communication dated Apr. 3, 2017, issued in connection with U.S. Appl. No. 14/495,590, filed Sep. 24, 2014, 5 pages.
Huang C.M., et al., "A Synchronization Infrastructure for Multicast Multimedia at the Presentation Layer," IEEE Transactions on Consumer Electronics, 1997, pp. 370-380, vol. 43, No. 3.
International Bureau, International Preliminary Report on Patentability dated Jan. 30, 2014, issued in connection with International Application No. PCT/US2012/047620, filed Jul. 20, 2012, 7 pages.
International Bureau, International Preliminary Report on Patentability dated Apr. 3, 2014, issued in connection with International Application No. PCT/US2012/056467, filed Sep. 21, 2011, 11 pages.
International Bureau, International Preliminary Report on Patentability, dated Aug. 6, 2015, issued in connection with International Application No. PCT/US2014/012534, filed Jan. 22, 2014, 6 pages.
International Bureau, International Preliminary Report on Patentability dated Dec. 15, 2016, issued in connection with International Application No. PCT/US2015/031934, filed May 21, 2015, 11 pages.
International Bureau, International Preliminary Report on Patentability dated Aug. 18, 2016, issued in connection with International Application No. PCT/US2015/014156, filed Feb. 3, 2015, 10 pages.
International Bureau,International Preliminary Reporton Patentability dated Sep. 15, 2016, issued in connection with International Application No. PCT/US2015/018850, filed Mar. 5, 2015, 10 pages.
International Searching Authority, International Preliminary Report on Patentability dated Apr. 6, 2017, issued in connection with International Application No. PCT/US2015/051968 filed on Sep. 24, 2015, 10 pages.
International Searching Authority, International Preliminary Report on Patentability dated Apr. 6, 2017, issued in connection with International Application No. PCT/US2015/051975 filed on Sep. 24, 2015, 9 pages.
International Searching Authority, International Preliminary Report on Patentability dated Apr. 6, 2017, issued in connection with International Application No. PCT/US2015/051983 filed on Sep. 24, 2015, 7 pages.
International Searching Authority, International Preliminary Report on Patentability dated Apr. 6, 2017, issued in connection with International Application No. PCT/US2015/051989 filed on Sep. 24, 2015, 7 pages.
International Searching Authority, International Preliminary Report on Patentability dated Apr. 6, 2017, issued in connection with International Application No. PCT/US2015/051993 filed on Sep. 24, 2015, 8 pages.
International Searching Authority, International Preliminary Report on Patentability dated Feb. 23, 2017, issued in connection with International Application No. PCT/US2015/044218, filed on Aug. 7, 2015, 10 pages.
PRISMIQ, Inc., "PRISMIQ Media Player User Guide," 2003, 44 pages.
Rothermel et al., "An Adaptive Stream Synchronization Protocol," 5th International Workshop on Network and Operating System Support for Digital Audio and Video, 1995, 13 pages.
Schulzrinne H., et al., "RTP: A Transport Protocol for Real-Time Applications, RFC 3550," Network Working Group, 2003, pp. 1-89.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
U.S. Appl. No. 12/070,933, filed Feb. 22, 2008. "System, Method, and Computer Program for Remotely Managing a Digital Device" Inventor: Jonathan Lang, et al.
U.S. Appl. No. 13/533,105, filed Jun. 26, 2012. "Systems, Methods, Apparatus, and Articles of Manufacture to Provide a Crowd-Sourced Playlist with Guess Access" Inventor: Paul Bates, et al.
U.S. Appl. No. 13/533,785, filed Jun. 26, 2012. "Networked Music Playback Including Remote Discovery and Add to Queue" Inventor: Mark Triplett, et al.
U.S. Appl. No. 13/748,357, filed Jan. 23, 2013. "System and Method for a Media Experience Social Interface" Inventor: Ron Kuper, et al.
U.S. Appl. No. 13/871,785, filed Apr. 26, 2013. "Systems, Methods, Apparatus, and Articles of Manufacture to Provide Guest Access" Inventor: Paul Bates, et al.
U.S. Appl. No. 13/871,795, filed Jun. 20, 2013. "Systems, Methods, Apparatus, and Articles of Manufacture to Provide Guest Access" Inventor: Paul Bates, et al.
U.S. Appl. No. 14/173,253, filed Feb. 5, 2014. "Remote Creation of a Playback Queue for a Future Event" Inventor: Jaime Munoz, et al.
Van Buskirk, Eliot, "Music Needs 'Connective Tissue' and Facebook Wants to Build It," E http://evolver.fm/2011/09/01/music-needs-connective-tissue-and-facebook-wants-to-build-it, 2011, 6 pages.
Yamaha DME 32 manual: copyright 2001.
Yamaha DME 64 Owner's Manual; copyright 2004, 80 pages.
Yamaha DME Designer 3.0 Owner's Manual; Copyright 2008, 501 pages.
Yamaha DME Designer 3.5 setup manual guide; copyright 2004, 16 pages.
Yamaha DME Designer 3.5 User Manual; Copyright 2004, 507 pages.
Non-Final Office Action dated Jan. 24, 2018, issued in connection with U.S. Appl. No. 15/607,267, filed May 26, 2017, 17 pages.
Non-Final Office Action dated Dec. 27, 2018, issued in connection with U.S. Appl. No. 14/297,193, filed Jun. 5, 2014, 37 pages.
Non-Final Office Action dated Apr. 28, 2020, issued in connection with U.S. Appl. No. 14/297,193, filed Jun. 5, 2014, 34 pages.
Non-Final Office Action dated Nov. 28, 2017, issued in connection with U.S. Appl. No. 14/821,513, filed Aug. 7, 2015, 17 pages.
Non-Final Office Action dated Sep. 30, 2020, issued in connection with U.S. Appl. No. 15/595,519, filed May 15, 2017, 18 pages.
Non-Final Office Action dated Jul. 31, 2019, issued in connection with U.S. Appl. No. 15/595,519, filed May 15, 2017, 14 pages.
Non-Final Office Action dated Apr. 4, 2019, issued in connection with U.S. Appl. No. 15/612,126, filed Jun. 2, 2017, 9 pages.
Non-Final Office Action dated Aug. 4, 2020, issued in connection with U.S. Appl. No. 16/812,638, filed Mar. 9, 2020, 13 pages.
Non-Final Office Action dated Dec. 6, 2018, issued in connection with U.S. Appl. No. 14/495,633, filed Sep. 24, 2014, 15 pages.
Non-Final Office Action dated May 7, 2021, issued in connection with U.S. Appl. No. 15/664,634, filed Jul. 31, 2017, 22 pages.
North American MPEG-2 Information, "The MPEG-2 Transport Stream," Retrieved from the Internet: URL: http://www.coolstf.com/mpeg/#ts, 2006, pp. 1-5.
Notice of Allowance dated May 4, 2016, issued in connection with U.S. Appl. No. 13/748,357, filed Jan. 23, 2013, 11 pages.
Notice of Allowance dated Apr. 6, 2017, issued in connection with U.S. Appl. No. 14/197,403, filed Mar. 5, 2014, 5 pages.
Notice of Allowance dated Apr. 10, 2020, issued in connection with U.S. Appl. No. 16/188,186, filed Nov. 12, 2018, 10 pages.
Notice of Allowance dated Feb. 11, 2019, issued in connection with U.S. Appl. No. 15/692,090, filed Aug. 31, 2017, 8 pages.
Notice of Allowance dated Feb. 11, 2019, issued in connection with U.S. Appl. No. 16/143,301, filed Sep. 26, 2018, 15 pages.
Notice of Allowance dated Jan. 12, 2017, issued in connection with U.S. Appl. No. 14/495,595, filed Sep. 24, 2014, 5 pages .
Notice of Allowance dated Dec. 17, 2019, issued in connection with U.S. Appl. No. 16/174,703, filed Oct. 30, 2018, 11 pages.
Notice of Allowance dated Jan. 17, 2020, issued in connection with U.S. Appl. No. 15/612,126, filed Jun. 2, 2017, 5 pages.
Notice of Allowance dated Jul. 18, 2018, issued in connection with U.S. Appl. No. 15/227,074, filed Aug. 3, 2016, 8 pages.

(56) References Cited

OTHER PUBLICATIONS

Notice of Allowance dated Sep. 19, 2017, issued in connection with U.S. Appl. No. 14/455,651, filed Aug. 8, 2014, 12 pages.
Notice of Allowance dated Aug. 20, 2020, issued in connection with U.S. Appl. No. 15/607,267, filed May 26, 2017, 8 pages.
Notice of Allowance dated Jul. 21, 2020, issued in connection with U.S. Appl. No. 15/966,337, filed Apr. 30, 2018, 11 pages.
Notice of Allowance dated Aug. 24, 2017, issued in connection with U.S. Appl. No. 14/495,590, filed Sep. 24, 2014, 10 pages.
Notice of Allowance dated Aug. 24, 2020, issued in connection with U.S. Appl. No. 16/516,767, filed Jul. 19, 2019, 9 pages.
Notice of Allowance dated Jan. 26, 2017, issued in connection with U.S. Appl. No. 14/495,706, filed Sep. 24, 2014, 8 pages.
Notice of Allowance dated Dec. 27, 2017, issued in connection with U.S. Appl. No. 14/495,659, filed Sep. 24, 2014, 6 pages.
Notice of Allowance dated Dec. 27, 2019, issued in connection with U.S. Appl. No. 14/495,633, filed Sep. 24, 2014, 7 pages.
Notice of Allowance dated Apr. 28, 2020, issued in connection with U.S. Appl. No. 15/612,126, filed Jun. 2, 2017, 5 pages.
Notice of Allowance dated Dec. 29, 2016, issued in connection with U.S. Appl. No. 14/197,403, filed Mar. 5, 2014, 5 pages.
Notice of Allowance dated Aug. 30, 2018, issued in connection with U.S. Appl. No. 14/821,513, filed Aug. 7, 2015, 10 pages.
Notice of Allowance dated Oct. 30, 2019, issued in connection with U.S. Appl. No. 16/458,453, filed Jul. 1, 2019, 7 pages.
Notice of Allowance dated May 31, 2017, issued in connection with U.S. Appl. No. 14/495,684, filed Sep. 24, 2014, 5 pages.
Notice of Allowance dated Feb. 4, 2021, issued in connection with U.S. Appl. No. 16/812,638, filed Mar. 9, 2020, 7 pages.
Notice of Allowance dated May 4, 2017, issued in connection with U.S. Appl. No. 14/495,595, filed Sep. 24, 2014, 5 pages.
Notice of Allowance dated Aug. 5, 2019, issued in connection with U.S. Appl. No. 15/612,126, filed Jun. 2, 2017, 5 pages.
Notice of Allowance dated Aug. 5, 2020, issued in connection with U.S. Appl. No. 16/188,186, filed Nov. 12, 2018, 11 pages.
Notice of Allowance dated May 5, 2021, issued in connection with U.S. Appl. No. 15/595,519, filed May 15, 2017, 7 pages.
Palm, Inc., "Handbook for the Palm VII Handheld," May 2000, 311 pages.
Park et al., "Group Synchronization in MultiCast Media Communications," Proceedings of the 5th Research on Multicast Technology Workshop, 2003, 5 pages.
Polycom Conference Composer User Guide, copyright 2001, 29 pages.
Pre-Brief Conference Decision dated Sep. 7, 2018, issued in connection with U.S. Appl. No. 14/297,193, filed Jun. 5, 2014, 2 pages.
Preinterview First Office Action dated May 4, 2016, issued in connection with U.S. Appl. No. 14/455,651, filed Aug. 8, 2014, 7 pages.
Preinterview First Office Action dated May 4, 2016, issued in connection with U.S. Appl. No. 14/495,659, filed Sep. 24, 2014, 6 pages.
Preinterview First Office Action dated May 5, 2016, issued in connection with U.S. Appl. No. 14/495,595, filed Sep. 24, 2014, 6 pages.
Preinterview First Office Action dated May 16, 2016, issued in connection with U.S. Appl. No. 14/495,633, filed Sep. 24, 2014, 6 pages.
Preinterview First Office Action dated Oct. 19, 2016, issued in connection with U.S. Appl. No. 14/821,513, filed Aug. 7, 2016, 5 pages.
Preinterview First Office Action dated May 23, 2016, issued in connection with U.S. Appl. No. 14/495,684, filed Sep. 24, 2014, 6 pages.
Presentations at WinHEC 2000, May 2000, 138 pages.

\* cited by examiner

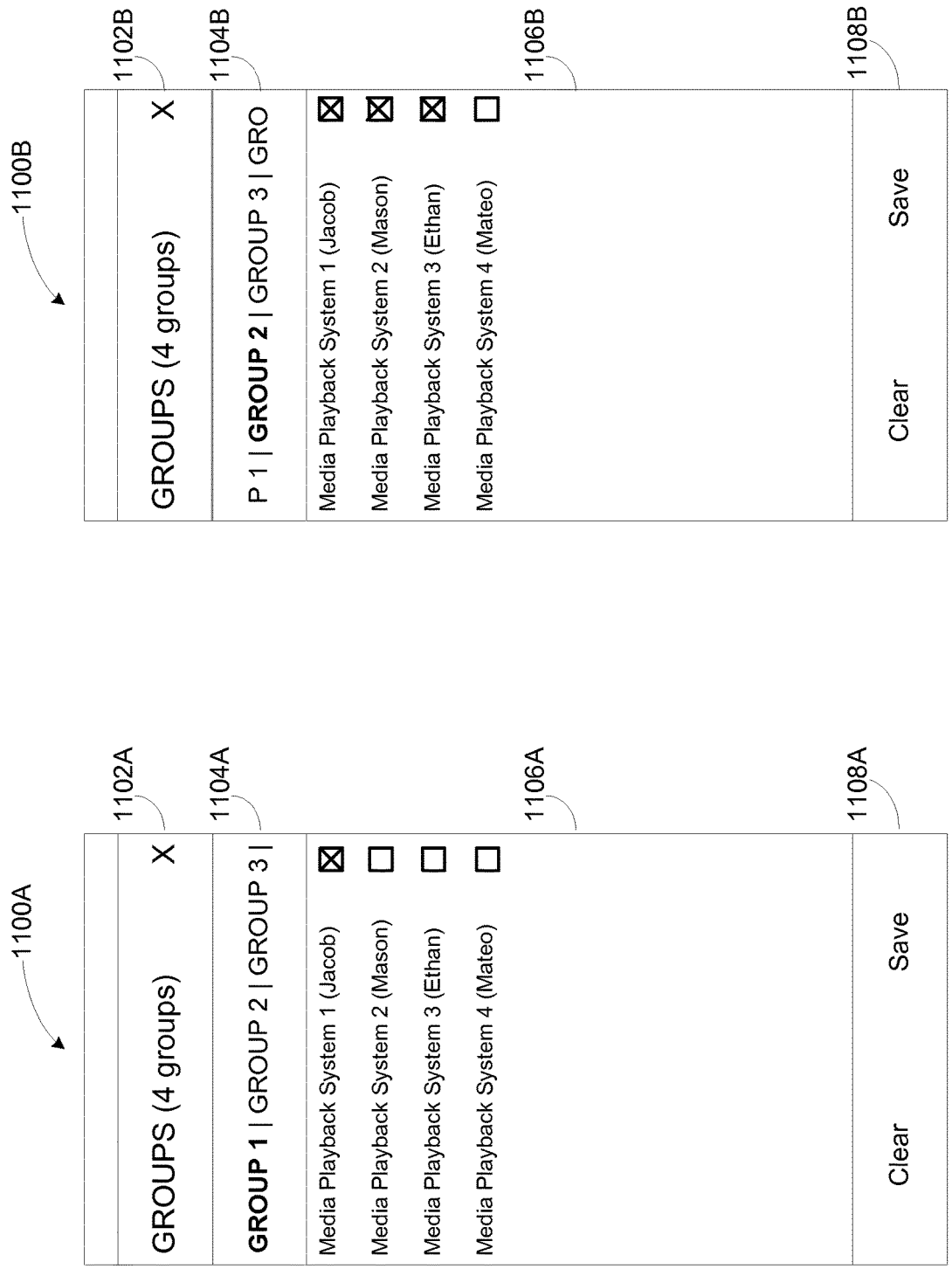

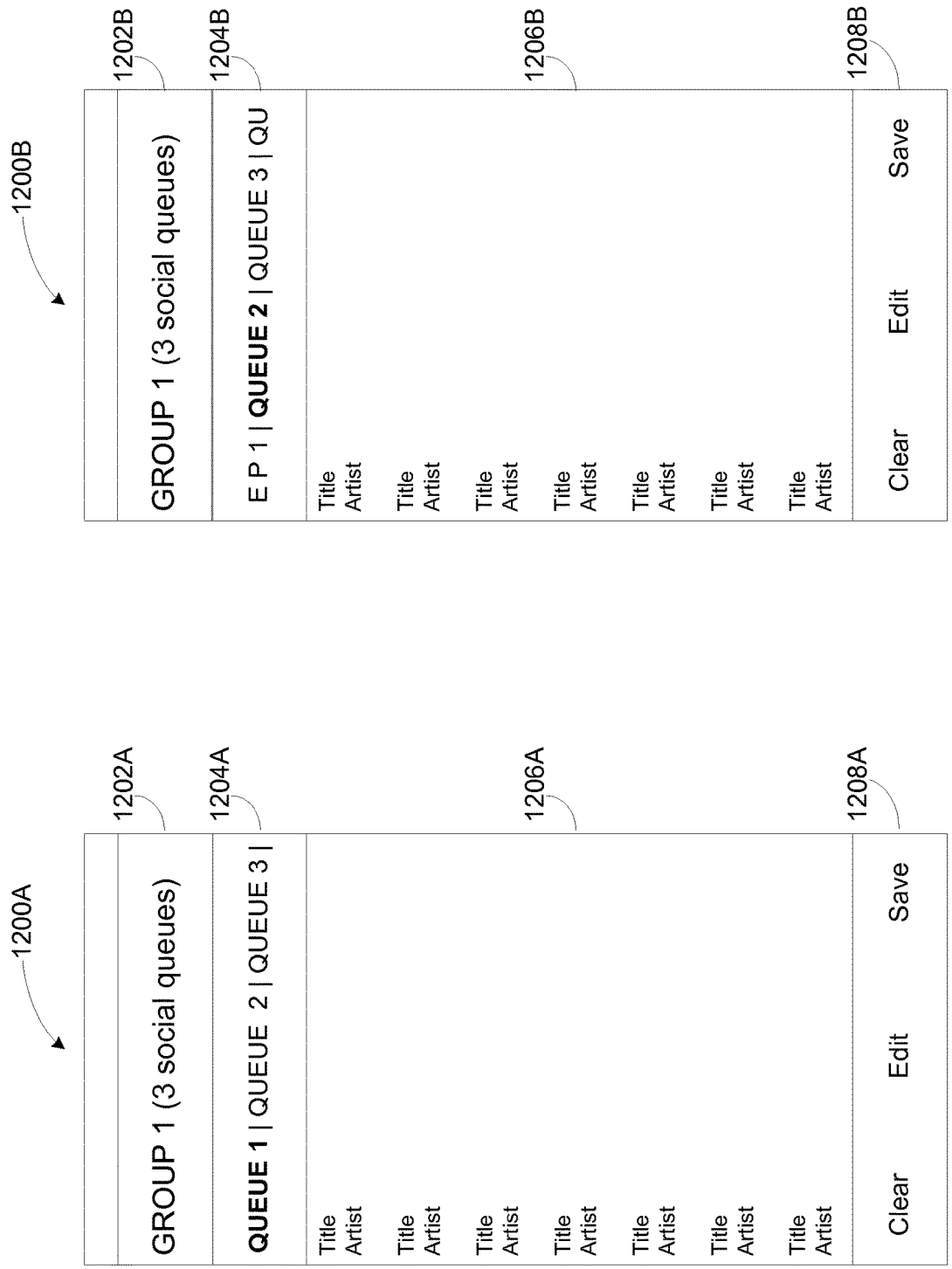

MULTIMEDIA CONTENT DISTRIBUTION SYSTEM AND METHOD

RELATED APPLICATIONS

This application is a continuation under 35 U.S.C. § 120 of U.S. application Ser. No. 14/297,193, filed Jun. 5, 2014.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

FIGS. 11A and 11B show example user interfaces to facilitate group formation;

FIGS. 12A and 12B show example user interfaces to facilitate social queue interaction.

Figure 1:
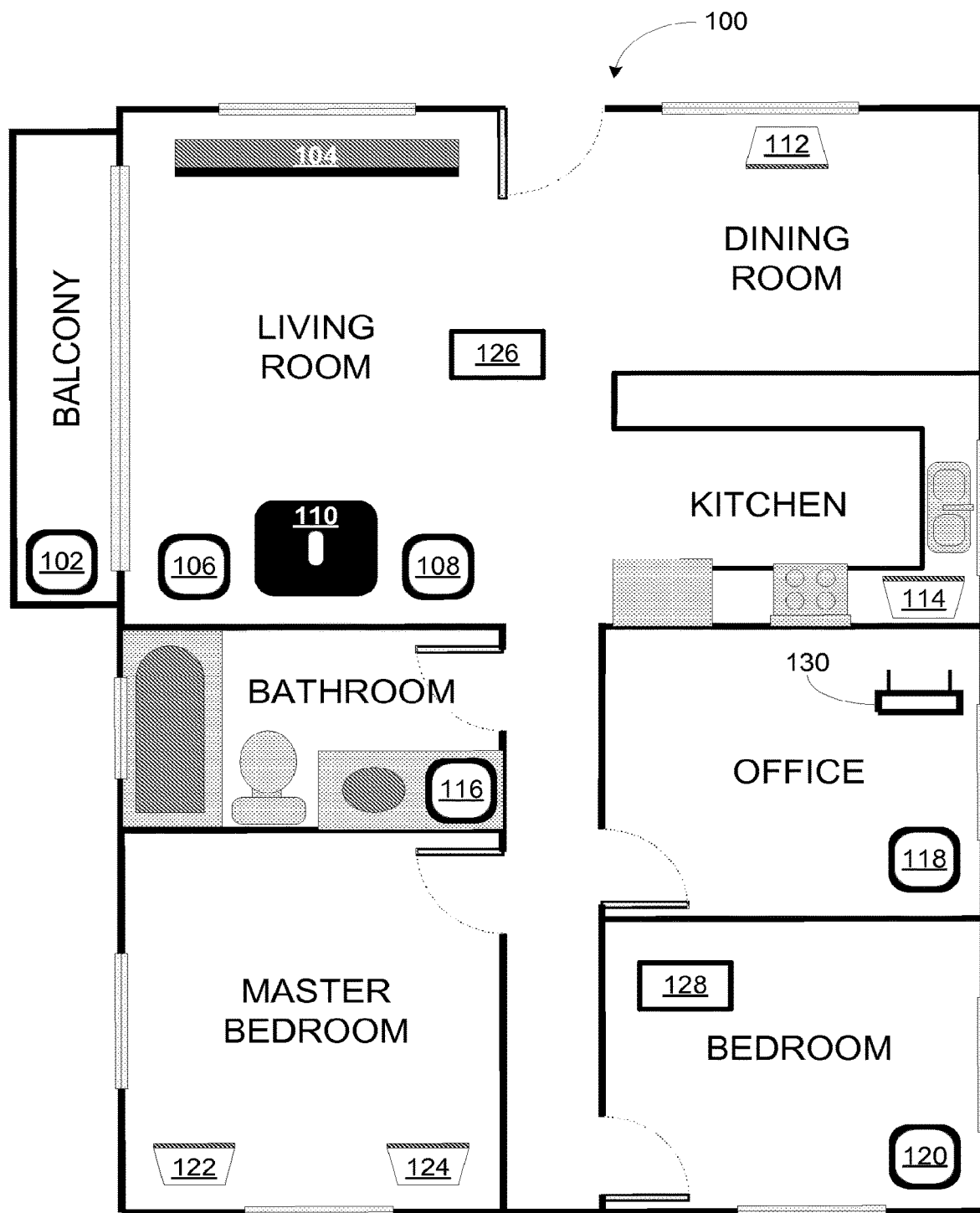
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

In some arrangements, a device within a media playback system may generate a playback queue of media items. The media playback system may then perform various operations with respect to the playback queue. For instance, the media playback system may play back media items in the playback queue. Further, input received by the media playback system may modify the playback queue by adding media items to or removing media items from the playback queue. Some such uses of the playback queue might be limited to use by the media playback system itself.

Examples described herein involve a "social" queue of media items for use by a group of two or more media playback systems. Media playback systems in the group may collaboratively interact with the social queue. For instance, each media playback system in the group may contribute media items to the social queue, such that the social queue includes media items contributed from multiple media playback system in the group. Further, each media playback system in the group may play back the media items in the social queue.

In one example, a group of media playback systems may include a first media playback system and a second media playback system. The first media playback system and the second media playback system may be in different locations, such as at a first user's home or workplace and at a second user's home or workplace, respectively. The first media playback system may communicate with the second media playback system over a network, such as the Internet. A first control device of the first media playback system may create, access, and modify the social queue. Likewise, a second control device of the second media playback system may create, access, and modify the social queue. Further, the first control device and the second control device may cause playback of media items in the social queue at one or more first playback devices of the first media playback system and one or more second playback devices of the second media playback system, respectively. In this way, the first control device and the second control device may facilitate collaborative interaction to control playback of media items at their respective media playback systems by interaction with the social queue.

As members of a group, the first media playback system and the second media playback system may have certain defined relationships with one another. They may share information, such as media items to add to the social queue or an indication of whether the media system is presently accessing the social queue. Further, they may operate according to one or more group rules. One group rule may require the first media playback system and the second media playback system to have access to one or more of the same audio content sources, to facilitate access by both media playback systems to media playback items in the social queue. Many other examples of information sharing and group rules are possible as well.

In some cases, a cloud service, such as a social networking service, may facilitate group formation and use of the social queue. For instance, a social networking service may provide an interface for selecting media playback systems for grouping. Such selectable media playback systems may be registered to users with whom the particular user of the social networking service has formed connections within the social networking service. For example, the a media playback system registered to a particular user may offer to group with media playback systems of one or more of the user's "friends" on a social networking service. The interface of the social networking service may also provide transport controls for causing playback of the social queue on the media playback system and media selection controls for selecting media items to add to the social queue.

As indicated above, the present application involves a social queue for a group of media playback systems. In one aspect, a method is provided. The method involves receiving, from a first media playback system, a first message indicating a first set of media items and receiving, from a second media playback system, a second message indicating a second set of media items. The method also involves generating a playback queue comprising the first set of media items indicated in the first message and the second set of media items indicated in the second message. The method further involves transmitting, to at least one of the first media playback system and the second media playback system, the generated playback queue.

In another aspect, a device is provided. The device includes a processor, a network interface, a non-transitory computer-readable storage medium, and program logic stored on the non-transitory computer-readable medium and executable by the processor to perform functions. The functions include receiving, from a first media playback system, a first message indicating a first set of media items and receiving, from a second media playback system, a second message indicating a second set of media items. The functions also include generating a playback queue comprising the first set of media items indicated in the first message and the second set of media items indicated in the second message. The functions further include transmitting, to at least one of the first media playback system and the second media playback system, the generated playback queue.

In yet another aspect, a non-transitory computer readable memory is provided. The non-transitory computer readable memory has stored thereon instructions executable by a computing device to cause the computing device to perform functions. The functions include receiving, from a first media playback system, a first message indicating a first set of media items and receiving, from a second media playback system, a second message indicating a second set of media items. The functions also include generating a playback queue comprising the first set of media items indicated in the first message and the second set of media items indicated in the second message. The functions further include transmitting, to at least one of the first media playback system and the second media playback system, the generated playback queue.

In another aspect, a method is provided. The method involves receiving, at a computing device associated with a first media playback system, a command to form a group of media playback systems that comprises the first media playback system and at least one other media playback system. The method also involves receiving, at the computing device, an identification of at least one source of audio for playback by the group of media playback systems. The method further involve sending, by the computing device to the at least one other media playback system, a message comprising (i) an indication of the received command to form the group of media playback systems and (ii) an indication of the at least one source of audio for playback by the group of media playback systems.

In yet another aspect, a device is provided. The device includes a processor, a network interface, a non-transitory computer-readable storage medium, and program logic stored on the non-transitory computer-readable medium and executable by the processor to perform functions. The functions include receiving, at a computing device associated with a first media playback system, a command to form a group of media playback systems that comprises the first media playback system and at least one other media playback system. The function also include receiving, at the computing device, an identification of at least one source of audio for playback by the group of media playback systems. The functions further include sending, by the computing device to the at least one other media playback system, a message comprising (i) an indication of the received command to form the group of media playback systems and (ii) an indication of the at least one source of audio for playback by the group of media playback systems.

In another aspect, a non-transitory computer readable memory is provided. The non-transitory computer readable memory has stored thereon instructions executable by a computing device to cause the computing device to perform functions. The functions include receiving, at a computing device associated with a first media playback system, a command to form a group of media playback systems that comprises the first media playback system and at least one other media playback system. The function also include receiving, at the computing device, an identification of at least one source of audio for playback by the group of media playback systems. The functions further include sending, by the computing device to the at least one other media playback system, a message comprising (i) an indication of the received command to form the group of media playback systems and (ii) an indication of the at least one source of audio for playback by the group of media playback systems.

In yet one aspect, a method is provided. The method involves receiving an instruction that causes at least a first media playback system and a second media playback system to form a group of media playback systems. The method also involves receiving, from a third-party service provider, a first message indicating a first set of media items and a second message indicating a second set of media items. The method further involves generating a playback queue comprising the first set of media items indicated in the received first message and the second set of media items indicated in the received second message. The method also involves transmitting, to each media playback system in the group of media playback system, the generated playback queue.

In another aspect, a device is provided. The device includes a processor, a network interface, a non-transitory computer-readable storage medium, and program logic stored on the non-transitory computer-readable medium and executable by the processor to perform functions. The functions include receiving an instruction that causes at least a first media playback system and a second media playback system to form a group of media playback systems. The functions also include receiving, from a third-party service provider, a first message indicating a first set of media items and a second message indicating a second set of media items. The functions further include generating a playback queue comprising the first set of media items indicated in the received first message and the second set of media items indicated in the received second message. The functions also include transmitting, to each media playback system in the group of media playback system, the generated playback queue.

In yet another aspect, a non-transitory computer readable memory is provided. The non-transitory computer readable memory has stored thereon instructions executable by a computing device to cause the computing device to perform functions. The functions include receiving an instruction that causes at least a first media playback system and a second media playback system to form a group of media playback systems. The functions also include receiving, from a third-party service provider, a first message indicating a first set of media items and a second message indicating a second set of media items. The functions further include generating a playback queue comprising the first set of media items indicated in the received first message and the second set of media items indicated in the received second message. The functions also include transmitting, to each media playback system in the group of media playback system, the generated playback queue.

It will be understood by one of ordinary skill in the art that this disclosure includes numerous other embodiments. While some examples described herein may refer to functions performed by given actors such as "users" and/or other entities, it should be understood that this description is for purposes of explanation only. The claims should not be interpreted to require action by any such example actor unless explicitly required by the language of the claims themselves.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
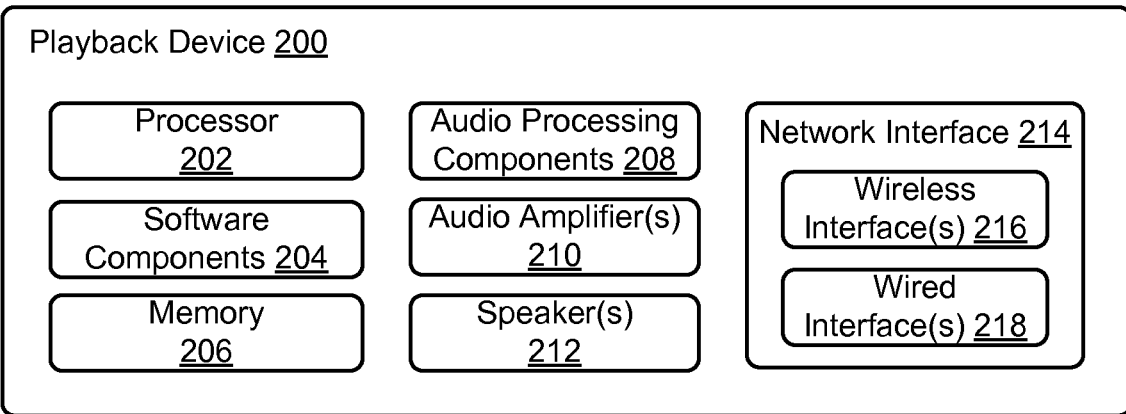
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e., a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
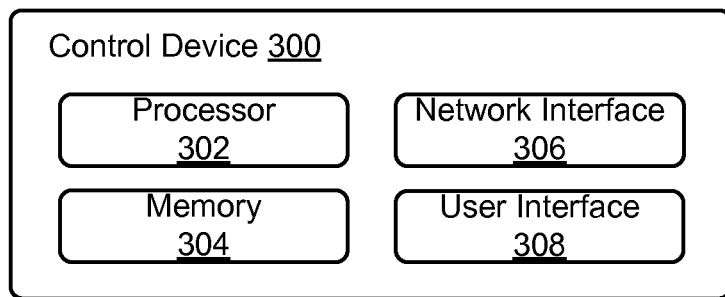
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). Control device 300 may communicate with other devices in the media playback system 100 via network interface 306. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
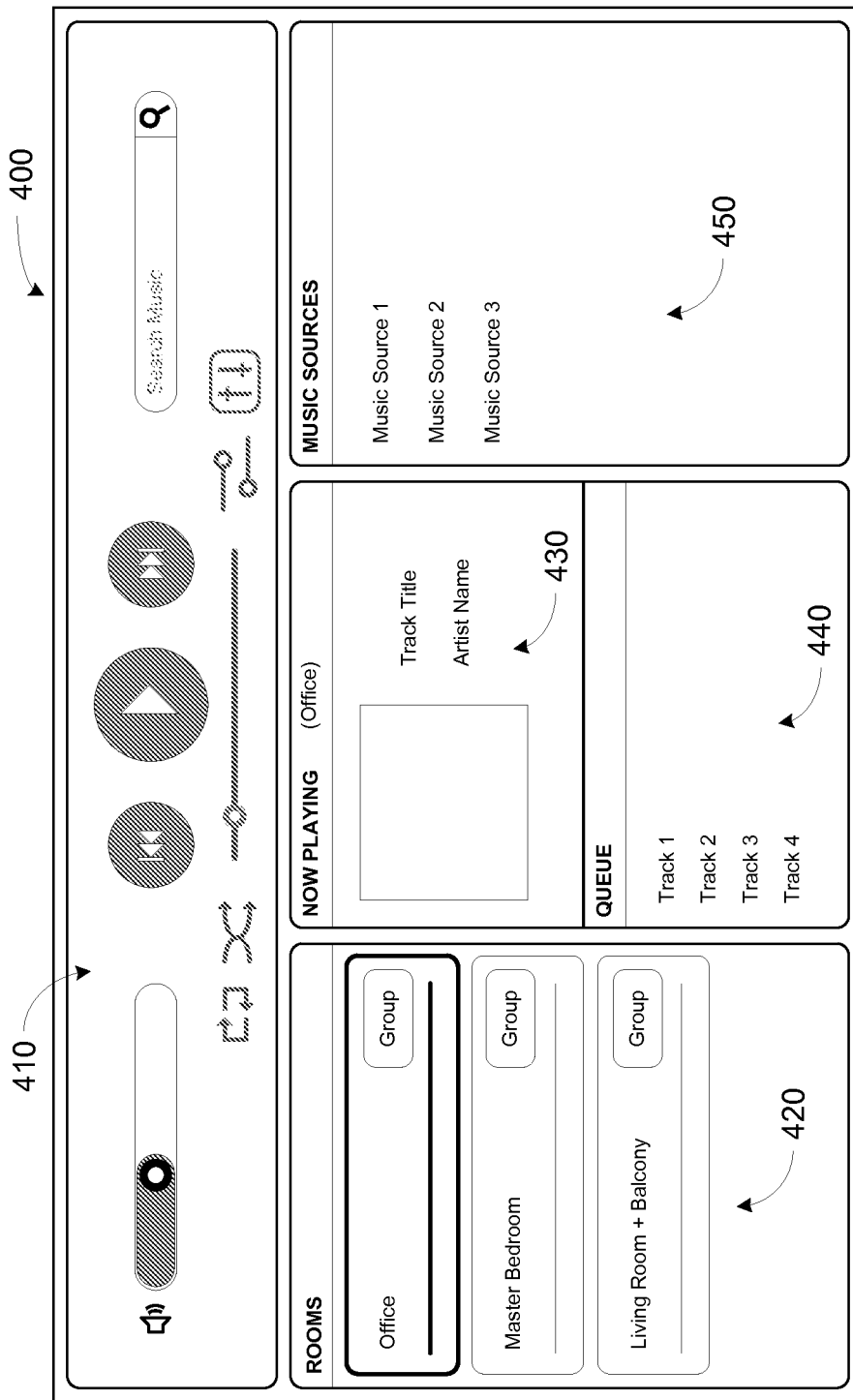
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

e. Example Cloud Computing Functions

Various references are made herein to "cloud computing" The term "cloud computing" is used to refer to services delivered using distributed computing over a network, such as the Internet. A non-exhaustive list of services delivered via the cloud include electronic mail (e.g., Gmail® or Hotmail®), social networking (e.g., Facebook®, LinkedIn®, or Twitter®), file hosting (e.g., Dropbox®), and streaming audio (e.g., Spotify®, Pandora®, or BeatsAudio®). Other cloud services are certainly offered as well.

Cloud service providers may offer one or more interfaces for accessing their service over a network. For instance, some cloud services may be accessed by visiting a web site using a web browser. Other cloud services are accessed by executing a particular application specific to the cloud service on a computing device. Some cloud services may offer an application programming interface (API) to facilitate access to the service by a third-party web site or application. In many cases, a user who has access to a given cloud service can access the service from any computing device that is connected to the network, provided that the computing device has a supported interface to the cloud service.

In one instance, accessing a cloud service may involve accessing, with a first computing device (i.e., a client), a second computing device (i.e., a server). Example client devices may include playback device 200 of FIG. 2, or control device 300 of FIG. 3, among other possible devices. One or more programs or applications (i.e., instructions) may execute on the server to perform computing tasks supported by the cloud service. The client may send various commands to the server to instruct the server to perform the computing tasks supported by the cloud service.

Figure 5:
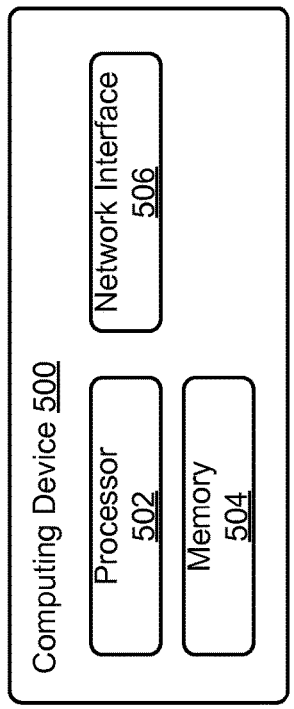
FIG. 5 shows a functional block diagram of an example computing device.

FIG. 5 illustrates an example computing device 500 that may provide a cloud service to one or more users. Example computing device 500 includes at least one processor 502, memory 504, and a network interface 506. The memory 504 may contain instructions executable by the processor 502 to perform computing tasks supported by a cloud service. The computing device 500 may communicate with other computing devices via the network interface 506.

In aggregate, the provision of a cloud service many involve multiple instances of computing device 500. Each instance of computing device 500 may provide the cloud service to one or more users. Cloud service providers may scale the number of instances of computing device 500 involved in providing the cloud service based on user demand.

Figure 6:
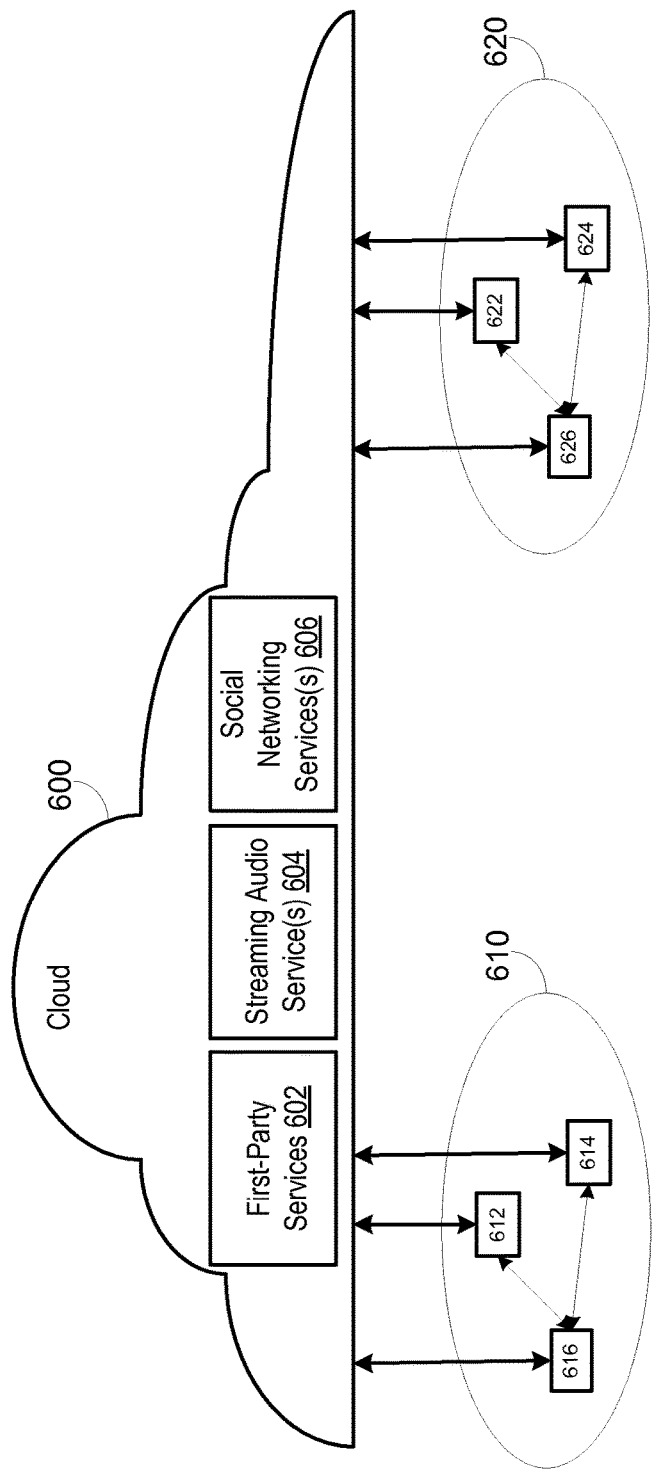
FIG. 6 is a simplified representation of an example system for cloud computing.

FIG. 6 illustrates an example cloud 600. The example cloud 600 may include any number of computing devices which are interconnected via one or more networks. For instance, cloud 600 may include one or more instances of computing device 500. As shown in FIG. 6, media playback systems 610 and 620 are connected to cloud 600. In particular, media playback system 610 includes playback devices 612 and 614 and control device 616, each having a respective connection to cloud 600. Likewise, media playback system 620 includes playback devices 622 and 624 and control device 626, each having a respective connection to cloud 600.

Using the cloud 600, media playback systems 610 and 620 may access various cloud services. For example, a cloud service provider may provide one or more first-party services 602. In one instance, a manufacturer of media playback systems 610 and 620 may provide the one or more first-party services 602 to media playback systems 610 and 620. The one or more first-party services 602 may support various features of the media playback systems 610 and 620. Alternatively, another cloud service provider may provide the one or more first-party services 602 to media playback systems 610 and 620 under the direction of the manufacturer of media playback systems 610 and 620.

Media playback systems 610 and 620 may also access one or more streaming audio services 604. As noted above, streaming audio services may provide audio content to media playback systems. Several example streaming audio services that are currently available include Spotify®, Pandora®, BeatsAudio®, Rdio®, Google Play Music All Access®, Sony Music Unlimited®, iTunes Radio®, Xbox Music®, and TuneIn Radio®. Other streaming audio services certainly exist, and other streaming audio services may be offered in the future.

Media playback systems 610 and 620 may also access one or more social network services 606. Social network services are often characterized at least in part by various links between users of the service. Such links are referred to by different names, such as "friends", "connections", "followers", or "favorites," among other examples. Users may create such links for various reasons. For instance, in some cases, the users may have a relationship outside of the social network (e.g., co-workers, relatives, or college friends). In other cases, two users may have similar interests (e.g., fans of a particular band or genre) or belong to a certain group and then form a link in the social network because they share these similar interests.

Social network services may provide access to various other cloud services. For instance, a social network service may provide an interface for accessing a streaming audio service. Such an interface may include transport controls controlling play back with respect to the streaming audio service. Further, such an interface could include media content controls for selecting media items provided by the streaming audio service for play back.

The above discussions relating to playback devices, controller devices, playback zone configurations, media content sources, and cloud computing provide only some examples of operating environments within which functions and methods described below may be implemented. Other operating environments and configurations of media playback systems, playback devices, and network devices not explicitly described herein may also be applicable and suitable for implementation of the functions and methods.

III. Example Social Queue For A Group of Media Playback Systems

As discussed above, embodiments described herein may involve a "social" queue for use by two or more media playback systems that are grouped together. For instance, two or more media playback systems may form a group of media playback systems. Then, the two or more grouped media playback systems may interact with a social queue.

Example entities that may carry out one or more of the functions described herein include, without limitation, a playback device (e.g., playback device 200), a control device (e.g., control device 300), or any suitable computing device (e.g., computing device 500). Accordingly, while in describing various functions, reference is made to a media playback system performing those various functions, it will be understood that each of these functions could be performed by any suitable component of a media playback system or by any suitable computing device that is connected to the media playback system.

a. Example Group of Media Playback Systems

In one example, a first media playback system may form a group with one or more other media playback systems, including at least a second media playback system. As members of the group, the first media playback system and the second media playback system may have a defined relationship with one another. For instance, the first media playback system and the second media playback system may have permission to exchange certain information with one another, or otherwise communicate. Further, the defined relationship may involve the first media playback system and the second media playback system acting accordingly to certain group rules.

Figure 7:
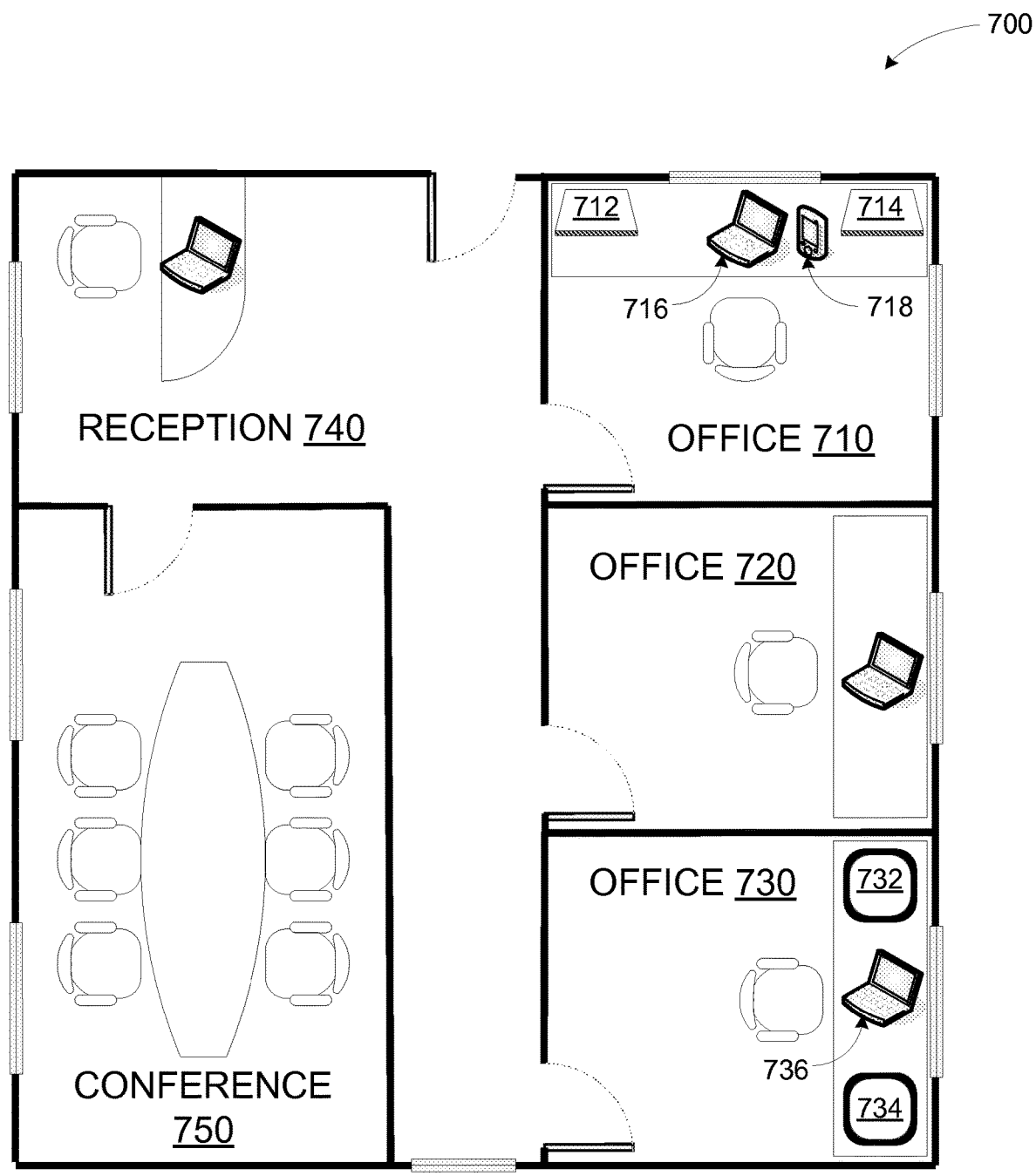
FIG. 7 shows an example environment in which the present methods may be implemented.

FIG. 7 is an example environment in which example embodiments may be implemented. FIG. 7 represents an office environment 700 having offices 710, 720, and 730, a reception area 740 and a conference room 750. Office 710 has therein a first media playback system that includes playback devices 712 and 714 and control devices 716 and 718. Office 730 has a second media playback system that includes playback devices 732 and 736 and control device 736.

The first media playback system and the second media playback system may belong to a first user that is assigned to office 710 and a second user that is assigned to office 730, respectively. From time to time, such as while working in their respective assigned offices, the first and second users may play back media items, such as audio tracks, on the first media playback system and the second media playback system, respectively. Further, the first and second users may have a variety of social and/or professional relationships. For instance, they may be co-workers, and they may also share similar tastes in music. Because of this shared taste in music, the first and second users may desire to share or mutually engage in a common listening experience. Accordingly, the first and second users may desire to group the first media playback system and the second media playback system to share a social queue. While the first and second user are described by way of example to aid in comprehension of the present invention, the first user, second user, and the relationships between them are not aspects of the present invention.

The first media playback system may initiate group formation with the second media playback system. For instance, the first media playback system may send to the second media playback system a first message that invites the second media playback system to group with the first media playback system. The second media playback system may then accept the invitation to form a group in a second message to the first media playback system. Or, the second media playback system may reject the invitation by not sending a second message or by indicating that the invitation is rejected in the second message.

Alternatively, the first media playback system may send to the second media playback system a first message that instructs the second media playback system to group with the first media playback system. In some cases, the second media playback system may have prior authorization to form a group in response to receiving a message that instructs or invites group formation. For example, the second media playback system may receive user input indicating authorization to form groups. The authorization may be limited to certain designated media playback systems.

The first media playback system and the second media playback system may exchange messages over a network using respective network interfaces, such as network interface 214 of playback device 200 or network interface 306 of control device 300. The network may be a local area network or a wide area network. In office environment 700, the network may be a local area network. However, the first media playback system and the second media playback system could also be located in different houses that are connected using a wide area network (e.g., the Internet).

The first media playback system and the second media playback system may exchange messages via a computing device, such as computing device 500 of FIG. 5. In some examples, the computing device may be one of multiple computing devices that provide a cloud service, such as first-party service 602 of FIG. 6. The computing device may connect to the first media playback system and the second media playback via respective connections over a wide area network, such as the Internet. For instance, media playback system 610 and 620 may connect to a computing device that provides a cloud service of cloud 600 using a network of cloud 600.

To facilitate message exchange between the first media playback system and the second media playback system, the computing device may maintain or have access to data indicating the configurations of the media playback systems. For each media playback system, the configuration data may include network addressing information, such as the IP address(es) of the media playback system. The configuration data may also include user information, such as the user profiles of one or more users that have registered with the media playback system. Further, the configuration data may include information indicating groups that the media playback system has joined.

To aid in forming the group of media playback systems, the first media playback system may also maintain or have access to data indicating media playbacks systems that are available to group with the first media playback system. Before forming a group, such as during a setup procedure, a media playback system may receive user registration information. The user registration information may include information that identifies one or more users of the first media playback system (e.g., a name and an email address). For instance, the first user and the second user may provide user registration information to the first media playback system and the second media playback system, respectively.

Based on such information, the second media playback device may indicate availability to group. For instance, the second media playback system may receive user input that indicates an email address (e.g., the email address of the first user) and willingness to group with a media playback system with which that email address is registered (e.g., the first media playback system). Based on that received user input, the second media playback system may send to the first media playback system an indication that the second media playback system is available to group.

In some cases, the first media playback system may receive such availability data over a network from a computing device, such as computing device 500 of FIG. 5. Further, in some examples, the computing device may have access to the user registration information for multiple users of media playback systems. The computing device may receive a message from the second media playback system that indicates willingness to group with a particular user (i.e., a particular user having certain registered user information). The computing device may then use look-up the particular user to determine the media playback system with which the particular user is registered. After identifying the media playback system registered to the particular user (e.g., the first media playback system), the computing device may send a message to the first media playback system that indicates that the second media playback system is available to group with the first media playback system.

In some cases, a social networking service (e.g., social network service 606 of FIG. 6) may facilitate "discovery" of media playback systems that are available to group with the first media playback system. As noted above, social network services are often characterized at least in part by links between users of the service, such as "friends", "connections", "followers", or "favorites," among other examples. The second user of the second media playback system may subscribe to a social networking service in which two subscribers that have formed a link within the social networking service are known as "friends." Through use of the social networking service, the second user of the second media playback system may form "friend" links with one or more other subscribers to the social networking service. Some social networking service provide application programming interfaces (APIs) or other means to access information that subscribers to the social networking service have opted to share with third-parties. For instance, an API may provide access to data indicating the friends of a given subscriber to a social networking service.

Among the user's "friends" in the social networking service, the user of the second media playback service may designate a given friend (e.g., the first user) with whom the user of the second media playback system is willing to group media playback systems. A computing device, such as controller device 300 of FIG. 3, or computing device 500 of FIG. 5, may receive an indication of such user input designating the friend. The computing device may then access data that correlates subscribers to the social networking service to media playback system with which they have registered. The computing device may look-up the friend within the data to determine which media playback system, if any, that the friend is registered with. The computing device may determine that the friend is registered with the first media playback system and then send to the first media playback system a message indicating availability to group.

Before forming the group, the first media playback system may display an indication of media playback systems that are available to group. For instance, a control device of the first media playback system may display on a user interface a list of media playback systems available to group. The first media playback system may then receive user input selecting one or more of the available media playback systems (e.g., the second media playback system). In response, the first media playback systems may send messages to the selected media playback systems inviting group formation.

FIG. 11A is an example user interface 1100A of a control device, such as control device 718 of FIG. 7, that may be configured to facilitate grouping of media playback systems. The user interface 1100A includes an information region 1102A, a group selection region 1104A, a media playback system selection region 1106A, and a control region 1108A. The user interface 1100A as shown is just one example of a user interface that may be provided on a control device and accessed by users to control a media playback system such as the media playback system 100. Other user interfaces of varying formats, styles, and interactive sequences may alternatively be implemented on one or more control devices to provide comparable control access to a media playback system.

The information region 1102A may include an indication that the user interface is presently configured for group modification. Further the information region 1102A may include an indication of a number of presently configured groups on the control device (e.g., four groups). The information region 1102A may include other information as well.

The group selection region 1104A may include selectable (e.g., by way of touch or by using a cursor) icons to select different groups for creation or modification. The group selection region 1104A may distinguish between groups using labels or other identifiers. For example, a given selectable icon may comprise a group label. The group selection region 1104A may distinguish between a currently selected group and other groups configured on the control device. For instance, the label of the currently selected group may appear in bold text, among many other examples. In FIG. 11A, Group 1 is shown as currently selected.

The media playback system selection region 1106A may include indications of media playback systems that are available to group. In FIG. 1106, media playback systems 1, 2, 3, and 4 are indicted as available to group. The media playback systems may be indicated by reference to a user registered to the media playback system (e.g., Jacob, Mason, Ethan, or Mateo, as shown). In addition, the media playback system selection region 1106A may indicate the media playback systems in the currently selected group. The media playback system selection region 1106A may indicate the media playback systems currently in a group may further include selectable icons to select different media playback systems with which to form a group. In FIG. 11A, Media Playback System 1 is shown as currently selected for inclusion in Group 1.

The control region 1108A may include selectable icons to control the group configuration. For instance, the control region may include a "Save" icon to commit changes made in the media playback system selection region 1106A. In some cases, user input selecting such an icon may cause the control device to send a message to the second media playback system.

User interface 1100B in FIG. 11B is another instance of user interface 1100A. The user interface 1100B includes an information region 1102B, a group selection region 1104B, a media playback system selection region 1106B, and a control region 1108B. In the group selection region 1104B, Group 2 is shown as currently selected. Further, in the media playback system selection region 1106B, Media Playback Systems 1, 2, and 3 are shown as currently selected for inclusion in Group 2.

Within examples, the first media playback system may have access to data indicating a "friend" list of the first media playback system. The friend list may indicate, as "friends," media playback systems that have indicated availability to group to the first media playback system, such as via a social networking service. In some examples, the media playback systems indicated in the friends list may have given prior authorization to group. A device, such as the control device 300 of FIG. 3 or the computing device 500 of FIG. 5, may maintain such a "friend" list for the first media playback system. The friend list may facilitate group formation. For instance, a control device of the first media playback system may display on a user interface an indication of the friend list. The first media playback system may then receive user input selecting a "friend" (e.g., the second media playback system) and subsequently form a group with the friend. Then, the first media playback system may receive user input selecting a second "friend" (e.g., a third media playback system) and then form a group that includes the first, second, and third media playback systems. Alternatively, at some point thereafter, the first media playback system may leave the group with the second media playback system and form a group with the third media playback system. Other groups are certainly possible as well.

After forming the group, the first media playback system may display an indication of the group. For instance, a control device of the first media playback system may display on a user interface the indication of the group. The indication of the group may depict the group in a variety of ways. For instance, the indication may be a group name.

Alternatively, the group may be indicated by reference to one or more users that are registered with each media playback system in the group.

The first message and the second message may be responsive to user input received by the first media playback system and the second media playback system, respectively. For instance, the first media playback system may receive user input that instructs the first media playback system to invite the second media playback system to form a group. After receiving the first message, the second media playback system may display an indication of the invitation from the first media playback system. The second media playback system may then receive user input indicating acceptance or rejection of the invitation to form the group, and then, in the second message, respond to the user input accordingly.

As noted above, media playback systems in a group may adhere to certain group rules. The group rules may facilitate compatibility with certain features. For instance, an example group rule may suggest that all media playback systems within the group have access to a particular audio source, such as a particular streaming audio service. This rule may support features that may necessitate the media playback systems in the group having access to media items provided by the streaming audio service. For instance, all of the members of a group may attempt to play back an audio track from the streaming audio service.

In some cases, during group formation, a determination may be made whether the media playback systems in the group adhere to the group rules. In one embodiment, the first media playback system may make such a determination. For instance, in a first message that invites a second media playback system to form a group, the first media playback may ask for a response from the second media playback system that indicates adherence by the second media playback system with one or more group rules. The second media playback system may then include such a response in a second message (which may also indicate acceptance of the invitation to form the group). After receiving the second message, the first media playback system may determine whether the second media playback system adheres to the group rules based on the response in the second message.

Alternatively, the second media playback system may make available configuration data to media playback systems with which it has indicated availability to form a group. The configuration data may indicate parameters on which group rules may be based. For example, the configuration data may indicate that the second media playback system has access to a particular streaming audio service. Then, based on such configuration data, the first media playback system may determine whether the second media playback system adheres to the group rules.

In other cases, a computing system, such as the computing system 500 of FIG. 5, may determine whether the second media playback system adheres to the group rules. As noted above, in some cases, the first media playback system and the second media playback system may exchange messages involved in group formation via a computing device. This computing device (or a similar computing device connected to that computing device via a network) may maintain or have access to the configuration data of the second media playback system noted above. Based on this configuration data, the computing device may determine whether the second media playback system adheres to the group rules. After determining that the second media playback system adheres to the group rules, the computing system may send a message to the first media playback system that indicates that the first media playback system adheres to the group rules. After receiving such a message, the first media playback system may then form a group with the second media playback system.

b. Example Method For Generating a Social Queue

As noted above, two or more media playback systems in a group may share access to a social queue. Media playback systems within the group may interact with the social queue in various ways. For instance, a given media playback system within the group may create a social queue, modify the social queue, or playback media items within the social queue.

Figure 8:
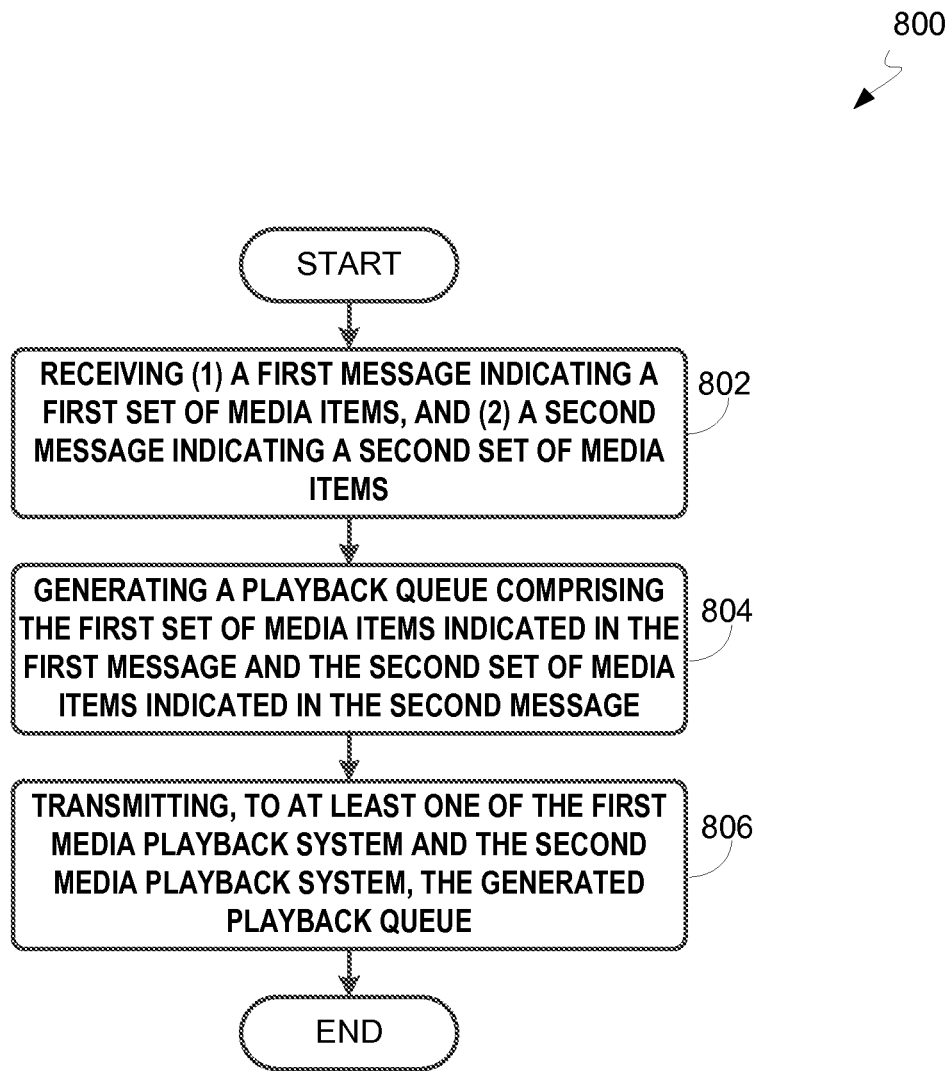
FIG. 8 shows an example flow diagram for generating a social queue.

Method 800 shown in FIG. 8 presents an embodiment of a method that can be implemented within an operating environment involving, for example, the media playback system 100 of FIG. 1, one or more of the playback device 200 of FIG. 2, and one or more of the control device 300 of FIG. 3. Method 800 may include one or more operations, functions, or actions as illustrated by one or more of blocks 802-806. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

i. Receiving (1) A First Message Indicating A First Set of Media Items, And (2) A Second Message Indicating A Second Set of Media Items.

At block 802, the method involves receiving a first message indicating a first set of media items and a second message indicating a second set of media items. For instance, computing device 500 may receive the first message and the second message via network interface 506. Computing device 500 may provide a cloud service that facilitates carrying out the present method to generate a social queue. For instance, first-party service 602 of cloud 600 may include a computing device 500 that receives the first message and the second message. Alternatively, a component of media playback system may receive the first message and the second message via a network interface, such as network interface 214 of playback device 200 or network interface 306 of control device 300.

Computing device 500 may receive the first message from a first media playback system and the second message from a second media playback system. Within examples, computing device 500 may receive the first message from a controller device or a playback device. For instance, network interface 506 may connect over a network (e.g., the Internet) with respective network interfaces of devices of the first media playback system and the second media playback system. In one example, referring back to FIG. 7, computing device 500 may receive the first message and the second message from the first media playback system in office 710 and the second media playback system in office 730, respectively.

Alternatively, computing device 500 may receive the first message from a computing device associated with the first media playback system. For instance, the computing device 500 may receive the first message from the first user's smartphone or personal computer. The association may be a particular link between the computing device and the first media playback system that establishes that messages from the computing device may specify a first set of media items on behalf of the first media playback system. For instance, the computing device may have a memory with instructions stored thereon such that the computing device may be a control device of the first media playback system. While the computing device need not necessarily control the first media playback system at all times, the computing device, by reason of linking with the first media playback system as a control device of the first media playback system, may specify the first set of media items.

In some cases, before sending the first message and the second message, the first media playback system and the second media playback system may form a group or indicate availability to form a group with one another. For example, before receiving the first message and the second message, the computing device 500 may receive a third message indicating that the first media playback system and the second media playback system shall form a group of media playback systems. After receiving the third message, the computing device 500 may cause the first media playback system and the second media playback system to form the group of media playback systems. Within examples, the first media playback system, the second media playback system, and or a third party service (e.g., social networking service 606 of FIG. 6) may send the third message. For instance, the first media playback system may send a message inviting the second media playback system to group. Alternatively, the third party service may send a message indicating two media playback systems to group.

The first set of media items may take a variety of different forms. The media items may include, for example, any of the example audio content noted above. The first set of media items may be media items that are currently queued for playback on the first media playback system. As noted above, playback queue region 440 of controller interface 400 shown in FIG. 4 may include graphical representations of audio items in a queue of a media playback system. In other cases, the first set of media items may be media items in a queue that has been saved for later playback on the first media playback system. Yet, in other cases, the first set of items may be a playlist. In still other cases, the first set of media playback items may include any media items designated for inclusion in the social queue. For instance, the first media playback system may receive user input via a controller interface, such as controller interface 400 of FIG. 4. The user input may designate certain media items for inclusion in the social queue. The second set of media items may, for example, represent any of the above examples with respect to the second media playback system. Other examples are certainly possible as well.

As noted above, the first user (of the first media playback system) and the second user (of the second media playback system) may share certain music interests, such as hip-hop. The first user and the second user may desire to enjoy their mutual interest in hip-hop by sharing media items via a social queue. In one example, the first user may designate on a controller interface of control device 718 a playlist some of her favorite hip-hop tracks. The first media playback system may then send an indication of these designated hip-hop tracks as a first set of media items in a first message to computing device 500. The second user may then designate on a controller interface of control device 736 tracks from a new hip-hop album. The first media playback system may then send an indication of these designated tracks from the new hip-hop album as a second set of media items in a second message to computing device 500.

ii. Generating A Playback Queue

At block 804, the method involves generating a playback queue comprising the first set of media items indicated in the first message and the second set of media items indicated in the second message. In particular, the generated playback queue may be a "social queue" that includes media items received from both the first media playback system and the second media playback system.

The computing device may generate the playback queue with the first set of media items and the second set of media items in different orders. For instance, the generated playback queue may list media items in the order that they are received by the computing device 500. Alternatively, the generated playback queue may list media items in random order.

In some cases, the first media playback system may have access to different audio content sources than the first media playback system. For instance, the first media playback system may have access to a first steaming audio service which provides 20 million streaming audio tracks. The second media playback system may have access to a second streaming audio service which provides access to 15 million streaming audio tracks. Typically, access is gained to a streaming audio service by registering with the audio service (i.e., providing user information to the audio service to create a user profile). Some audio services may also require payment of a subscription fee before accessing the streaming audio service. The first streaming audio service may provide many of the same audio tracks as the second streaming audio service, but, in some cases, the first streaming audio service may provide some audio tracks that are not available with the second streaming audio service. Similarly, the second streaming audio service may provide some audio tracks that are not available with the first streaming audio service.

In one instance, the first set of media items may include one or more audio tracks from the first audio service. For instance, a given media item in the first set of media items may have a particular media item identifier to access the one or more audio tracks using the first streaming service. The first message may specify the media item identifier for each media item in the first set. A media item identifier may be a string or a number that distinguishes the audio track. In some cases, the media item identifier may a URI or URL.

Since, as noted above, the second media playback system has access to the first streaming media service and not the second streaming media service, the second media playback system may be unable to playback the one or more audio tracks using the first audio service. However, the second media playback system may have access to the one or more audio tracks via the second streaming audio service. Therefore, the computing device 500 may cross-link the media item identifier of the first streaming service to a media item identifier of the second streaming audio service. For a given media item, cross-linking may involve searching the second media service provider for the media item and then determining the media item identifier of the media item in the second streaming audio service. To find the media item, the computing device may search the second audio service by title, artist, album, or by any suitable identifying information. To facilitate searching, each media item may have metadata embedded in the media item or associated with the media file. The metadata may specify various information about the file, such as the title, the artist, or the album, among other information. After cross-linking the media item between the first streaming audio service and the second streaming audio service, the social queue may include, for a given media item, a media item identifier of the first streaming audio service and a media item identifier of the second streaming audio service.

In other cases, before adding a given media playback item to the generated playback queue, the computing device 500 may determine whether the media playback systems in the group have access to the media playback item. For instance, the computing device 500 may determine that the first media playback system has access to the given media item using a given service (e.g., the first streaming media service or the second streaming media service). And the computing device 500 may determine that the second media playback system has access to the given media item using the given service. Then, based at least in part on the determinations, the computing device may add the given media item to the playback queue.

iii. Transmitting the Generated Playback Queue

At block 806, the method involves transmitting, to at least one of the first media playback system and the second media playback system, the generated playback queue. For instance, computing device 500 may transmit the generated playback queue to the first playback device in office 710 and the second playback device in office 730. In some cases, the computing device 500 may transmit the generated playback queue after receive a request for the generated playback queue (e.g., a request to play back media items in the generated playback queue).

In some cases, before transmitting the generated playback queue, computing device 500 may determine that at least one of the first media playback system and the second media playback system is in the group of media playback systems. The computing device 500 may then transmit the generated playback queue to each media playback system in the group of media playback systems.

The social queue (i.e., the generated playback queue) may cause playback of the media items in the social queue in a variety of different ways. In one example, the social queue may cause the first media playback system to playback the media items in the social queue as a radio-type channel in which the first media playback system can playback the media items, but is not necessarily able to control the order of playback. In other examples, the social queue may cause playback of the media items in round-robin order or in random order (i.e., shuffled), such as accordingly to a shuffling algorithm. In yet other examples, the first media playback system may receive user input that selects one or more particular media items from the social queue to playback. Further examples are possible as well.

Media playback systems may modify the generated playback queue (i.e., the social queue). For instance, after generating the playback queue, the computing device 500 may, receive, from the first media playback system, a command to modify the playback queue. The received command may indicate one or more media items. The command may instruct the computing device 500 to add the one or more media items indicated by the received command to the generated playback queue. Or the command may instruct the computing device 500 to remove the one or more media items indicated by the received command from the generated playback queue. Alternatively, the command may instruct the computing device 500 order or re-order the one or more media items indicated by the received command within the generated playback queue. After modifying the social queue, the computing device 500 may transmit, to the first media playback system and/or the second media playback system, the modified playback queue. This transmission may update the social queue to reflect the modification.

In some cases, the computing device 500 may carry out the received command to modify the playback queue, but, in other cases, the computing device 500 may decline to carry out the received command. Before carrying out the received command, the computing device 500 may determine that the received command obeys one or more group rules or queue rules. Group rules may apply to any social queue created by the group while queue rules may apply to a particular queue. Such group rules or queue rules may facilitate social aspects of the social queue. For instance, one rule may suggest that a command may not add or remove more than ten media items from the social queue per hour. This rule may facilitate more equal control of the social queue (e.g., adding and removing media items) by the first user and the second user. Another rule may suggest that the computing device send a message indicating the modification to the social queue to the first media playback system and the second media playback system.

A given group of media playback systems may have multiple social queues. Media playback systems within the group may select among the social queues. For instance, one social queue may be labeled "Opera." Users of media playback systems may tend to designate tracks in the opera genre in the "Opera" social queue. In some cases, the "Opera" social queue may have a queue rule that requires media items in the "Opera" queue to be audio tracks in the opera genre. For instance, before adding an item to the generated queue, the computing system may determine that the media item is in the opera genre. In some case, the computing system may base such a determination upon the media item's metadata, which may specify the genre of the media item, among other information. Other social queues may be labeled for other genres. Other social queues may be based on artist, album, date, or any other conceivable rationale for grouping. In some cases, the media items may have no apparent relationship to one another.

FIG. 12A is an example user interface 1200A of a control device, such as control device 718 of FIG. 7, that may be configured to facilitate various interactions with a social queue, such as playback or modification. The user interface 1200A includes an information region 1202A, a queue selection region 1204A, a social queue region 1206A, and a control region 1208A. The user interface 1200A as shown is just one example of a user interface that may be provided on a control device accessed by users to control a media playback system such as the media playback system 100. Other user interfaces of varying formats, styles, and interactive sequences may alternatively be implemented on one or more control devices to provide comparable control access to a media playback system.

The information region 1202A may include an indication of a currently selected group. In FIG. 12A, Group 1 is shown as currently selected. Further the information region 1202A may include an indication of a number of presently configured social queues (e.g., three social queues). The information region 1202A may include other information as well.

The queue selection region 1204A may include selectable (e.g., by way of touch or by using a cursor) icons to select different queues for playback, creation, or modification. The queue selection region 1204A may distinguish between groups using labels or other identifiers. For example, a given selectable icon may comprise a queue label. The queue selection region 1204A may distinguish between a currently selected queue and other queues configured on the control device. For instance, the label of the currently selected queue may appear in bold text, among many other examples. In FIG. 12A, Queue 1 is shown as currently selected.

The social queue region 1206A may include indications (e.g., graphical representations) of media items that are in the currently selected social queue. The graphical representations of media items in the social queue region 1206A may include track titles, artist names, track lengths, and other relevant information associated with the media items in the social queue. In one example, graphical representations of media items may be selectable to bring up additional selectable icons to manage and/or manipulate the social queue and/or media items represented in the social queue. For instance, a represented media item may be removed from the playback queue, moved to a different position within the playback queue, or selected to be played immediately, or after any currently playing audio content, among other possibilities.

The control region 1208A may include selectable icons to control the social queue configuration. For instance, the control region may include a "Save" icon to commit changes made in the social queue region 1206A. In some cases, user input selecting such an icon may cause the control device to send a message to a media playback system.

User interface 1200B in FIG. 12B is another instance of user interface 1200A. The user interface 1200B includes an information region 1202B, a queue selection region 1204B, a social queue region 1206B, and a control region 1208B. In the queue selection region 1104B, Queue 2 is shown as currently selected.

A media playback system may join multiple groups each having multiple social queues. In aggregate, from the perspective of the user, each queue may represent different "buckets" of media items. One bucket may be the "Opera" social queue noted above. Another bucket may represent a social queue belonging to a group that includes media playback systems registered to the user's friends in a particular social network. A third bucket may represent another social queue belonging to a group that includes media playback systems registered to a subset of a user's friends in another social network (e.g., friends from college). Many combinations are possible.

In some cases, a generated queue may include a set of media items from a source that is not the first media playback system or the second media playback system. For instance, computing device 500 may receive an additional set of media items from a third media playback system. In some cases, the third media playback system may add the additional set of media items to the generated playback queue. In other cases, the third media playback system may generate a second playback queue that comprises at least the additional set of media items. Then, the third media playback system may update the social queue and/or provide the second queue to the group. For example, the third media playback system may transmit the generated second playback queue to the first media playback system and/or the second media playback system.

Alternatively, computing device 500 may receive an additional set of media items from a computing device, such as another instance of computing device 500. The second instance of computing device 500 may provide a cloud service, such as a file hosting service or a social networking service, among other examples. For example, as part of a social networking service, the second instance of computing device 500 may provide various features. As one example, the social network service may provide an interface for displaying the social queue. The media playback system may have previously registered with the social networking service, such that the media playback system and the social networking service share certain information. For instance, registration may involve registering a user account associated with a media playback system with a user profile of the social networking service. The social networking service may then recognize the user profile as being associated with a certain media playback system. Further, the social networking system may recognize "friend" connections of the user profile. The social networking system may also recognize groups formed by the certain media playback system with media playback systems registered to other user profiles of the social networking service. Further, the social networking service may provide an interface that indicates such user profiles, media playback systems, and the groups to which the user profiles belong. As noted above, such an interface may be provided via a web browser or via a specialized application for the cloud service, among other examples.

The interface may also display an indication of the social queue, or the media items in the social queue. The indication of the social queue may indicate the media items in the social queue in various ways. For example, the interface may display an indication of which media items in the social queue were selected via the social networking service. The interface may display an indication of which user of the social networking service added particular media items to the social queue. Many examples are possible.

The interface may also display controls for selecting the additional set of media items from audio content sources available to media playback system registered to the user. In some cases the interface may display controls for selecting media tracks to include in a social queue for use by a group. An indication of selected media items may appear on the interface provided by the social network. Further, the social networking service may update its interface to indicate the selected media items in the social queue. Also, many social networking services also have messaging systems. An example social networking service may send, via a message system, messages that indicate that a particular social queue has been updated with an additional set of media items. Recipients of such a message may include users who have grouped their media playback systems together to use the particular social queue.

Those having skill in the art will appreciate that numerous other arrangements are possible in addition to the examples provided above. For example, a device of a media playback system, such a control device, or a playback device, may carry out one or more of the functions described above alone or in combination with another device.

c. Example Method to Facilitate a Social Queue of a Group of Media Playback Systems In one example, a control device of a media playback system may facilitate grouping media playback systems into a group having a social queue. However, one having skill in the art will appreciate that any suitable computing device may facilitate such features.

Figure 9:
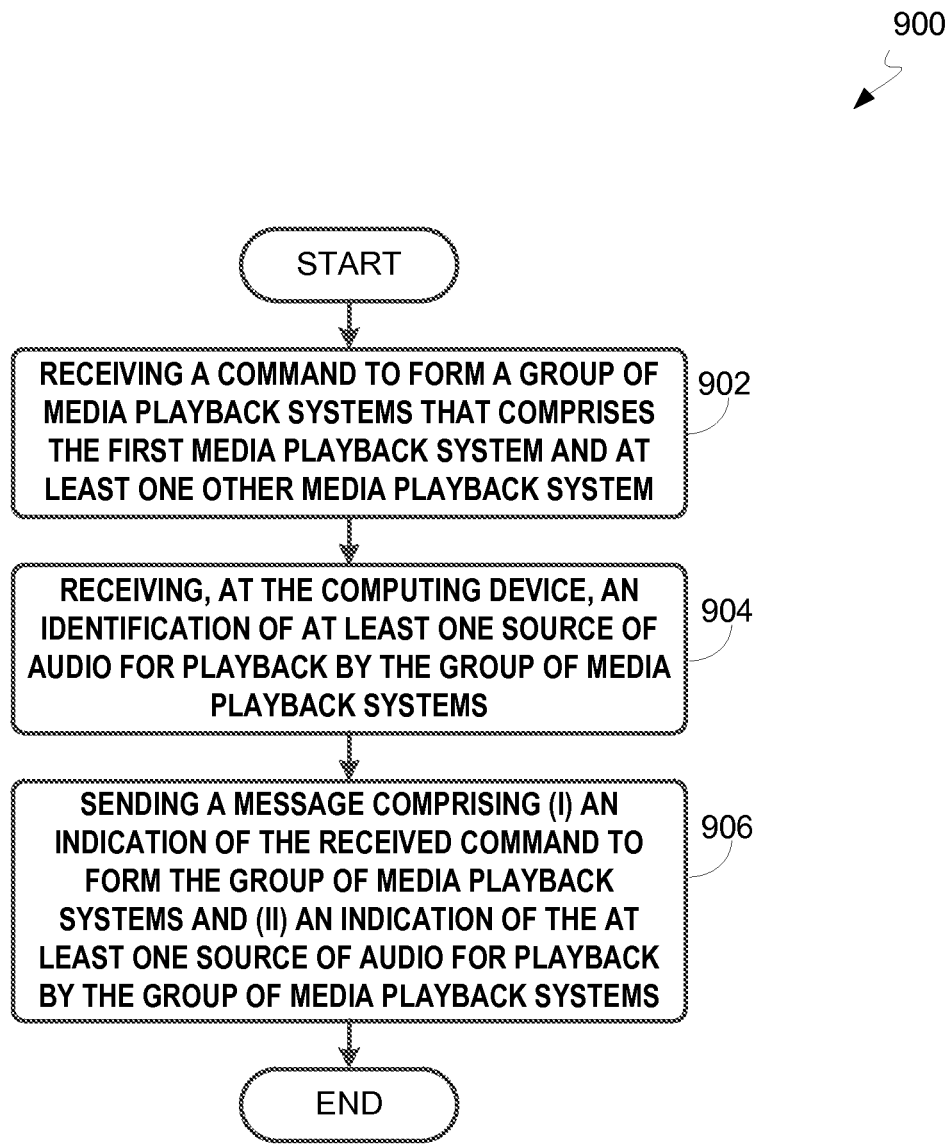
FIG. 9 shows an example flow diagram to facilitate a social queue for use by a group of media playback systems.

Method 900 shown in FIG. 9 presents an embodiment of a method that can be implemented within an operating environment involving, for example, the media playback system 100 of FIG. 1, one or more of the playback device 200 of FIG. 2, one or more of the control device 300 of FIG. 3, and one or more of computing device 500 of FIG. 5. Method 900 may include one or more operations, functions, or actions as illustrated by one or more of blocks 902-906. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

i. Receiving a Command to Form a Group of Media Playback Systems.

At block 902, the method involves receiving, at a computing device associated with a first media playback system, a command to form a group of media playback systems that comprises the first media playback system and at least one other media playback system. The computing device associated with a first media playback device may be a control device, such as control device 300. Alternatively, the computing device may be any computing device having a processor, memory, and a network interface.

As noted above, in FIG. 7, a first media playback system in office 710 includes control devices 716 and 718 (as well as playback devices 712 and 714). Also, control devices 716 and 718 may be instances of control device 300 of FIG. 3. In one example, control device 716 may receive via a controller interface (e.g., controller interface 1100A or 1100B) user input that indicates a command to form a group of media playback systems. The command may indicate the second media system in office 730, which includes playback devices 732 and 734, and also control device 736. The command may also indicate one or more media playback systems in addition to the second media playback system.

In some cases, before receiving the command to form the group of media playback systems, control device 716 may display a list of media playback systems available for grouping. Control device may display such a list on a user interface, such as user interface 1100A or 1100B. As noted above, to aid in forming the group of media playback systems, the first media playback system may maintain or have access to data indicating media playbacks systems that are available to group with the first media playback system. Control device 716 may access such data from a memory, such as memory 304, or request and then receive such data over a network interface, such as network interface 306. After displaying the list of available media playback systems, control device 716 may receive user input indicating a selection of one or more of the media playback systems displayed in the list of media playback systems available for grouping. In one example, control device 716 may receive user input representing a selection of the second media playback system in office 730.

ii. Receiving an Identification of at Least One Source of Audio for Playback by the Group of Media Playback Systems.

At block 904, the method involves receiving, at the computing device, an identification of at least one source of audio for playback by the group of media playback systems. For instance, control device 300 may receive an identification of at least one source of audio for playback by the group of media playback systems.

Referring back to FIG. 7, in one example, control device 716 may receive via a controller interface user input that indicates an identification of at least one source of audio for playback by the group of media playback systems. Before receiving the identification, control device 716 may display available sources of audio. For example, control device 716 may display available sources of audio in an audio content sources region 450 of a controller interface 400. Control device 716 may then receive user input indicating a selection of at least one source of audio.

Available sources of audio may include, without limitation, a queue of the first media playback system, an auxiliary input (i.e., line-in) input, an internet radio channel, a playlist of locally available media items, or a playlist of media items available from a streaming media service. The queue of the first media playback system may be a queue of media items currently queued for playback, or it may be a saved queue of media playback items. Other examples of audio sources are possible as well.

In some cases, the at least one source of audio for playback may include at least a first audio source and a second audio source. In such an instance, the control device 716 may send an instruction to the second media playback system to select the second audio source. The control device may then receive user input that indicates a selection of the first audio source. And the control device 716 may receive a message from the second media playback system that indicates a second audio source.

iii. Sending a Message Comprising (i) an Indication of the Received Command to Form the Group of Media Playback Systems and (ii) an Indication of the at Least One Source of Audio for Playback by the Group of Media Playback Systems.

At block 906, the method involves sending, by the computing device to the at least one other media playback system, a message comprising (i) an indication of the received command to form the group of media playback systems and (ii) an indication of the at least one source of audio for playback by the group of media playback systems.

The message comprising the indication of the received command to form the group of media playback systems may cause the media playback system(s) receiving the message to form a group with the first media playback system. In one example, control device 716 may send message(s) inviting the at least one other media playback system to group. Control device 300 may then receive message(s) from the at least one other media playback system that acknowledges the indication of the command to form the group of media playback systems. Such acknowledgement may indicate to the control device 300 willingness to form the group. In some cases, control device 716 may cause the first media playback to form the group in response to the indication of the command to form the group. In other case, control device 716 may form the group in response to receiving the acknowledgement. The first media playback system and the second media playback system may then form a group.

The indication of the at least one source of audio for playback by the group of media playback systems may be a social queue, or it may list media items to include in a social queue, among other examples. After receiving the indication, a media playback system may play back the at least one source of audio, or otherwise interact with it.

In some cases, the first media playback system and the second media playback system may have access to the same media items via different audio sources. For example, the first media playback system may have access to a first media service provider and the second media player may have access to a second media service provider. In such a circumstance, the control device may cross-link the media items between the two different audio sources. The indication of the at least one source of audio for playback may include a media item identifier for each audio source. Then, the first media playback system and the second media playback system may play back the same media items from a first audio source and a second audio source, respectively.

In one example, the first audio source and the second audio source may be a playback queue of the first media playback system and a playback queue of the second media playback system respectively. The playback queue of the first media playback system may indicate a first set of media items. A given media item of the playback queue of the first media playback system may be associated with a respective media item identifier of the first media service provider (e.g., a first streaming audio service). At the same time, the playback queue of second first media playback system may indicate a second set of media items. A given media item of the playback queue of the second media playback system may be associated with a respective media item identifier of the second media service provider (e.g., a second streaming audio service).

Given these two audio sources, control device 716 may associate the respective media item identifier of the first media service provider with a respective media item identifier of the second media service provider. Control device 716 may then send to the second media playback system an indication of the playback queue of the first media playback system. The indication may include at least the respective media item identifier of the second media service provider. After receiving the indication, the second media playback system may play back the media items in the playback queue of the first media playback system by accessing the media items at the second media service provider using the respective media item identifiers of the media items at the second media service provider.

d. Second Example Method to Facilitate a Social Queue of a Group of Media Playback Systems In another example, a computing device providing a cloud service, such as a social networking service, may facilitate grouping media playback systems into a group having a social queue. However, one having skill in the art will appreciate that any suitable computing device may facilitate such features.

Figure 10:
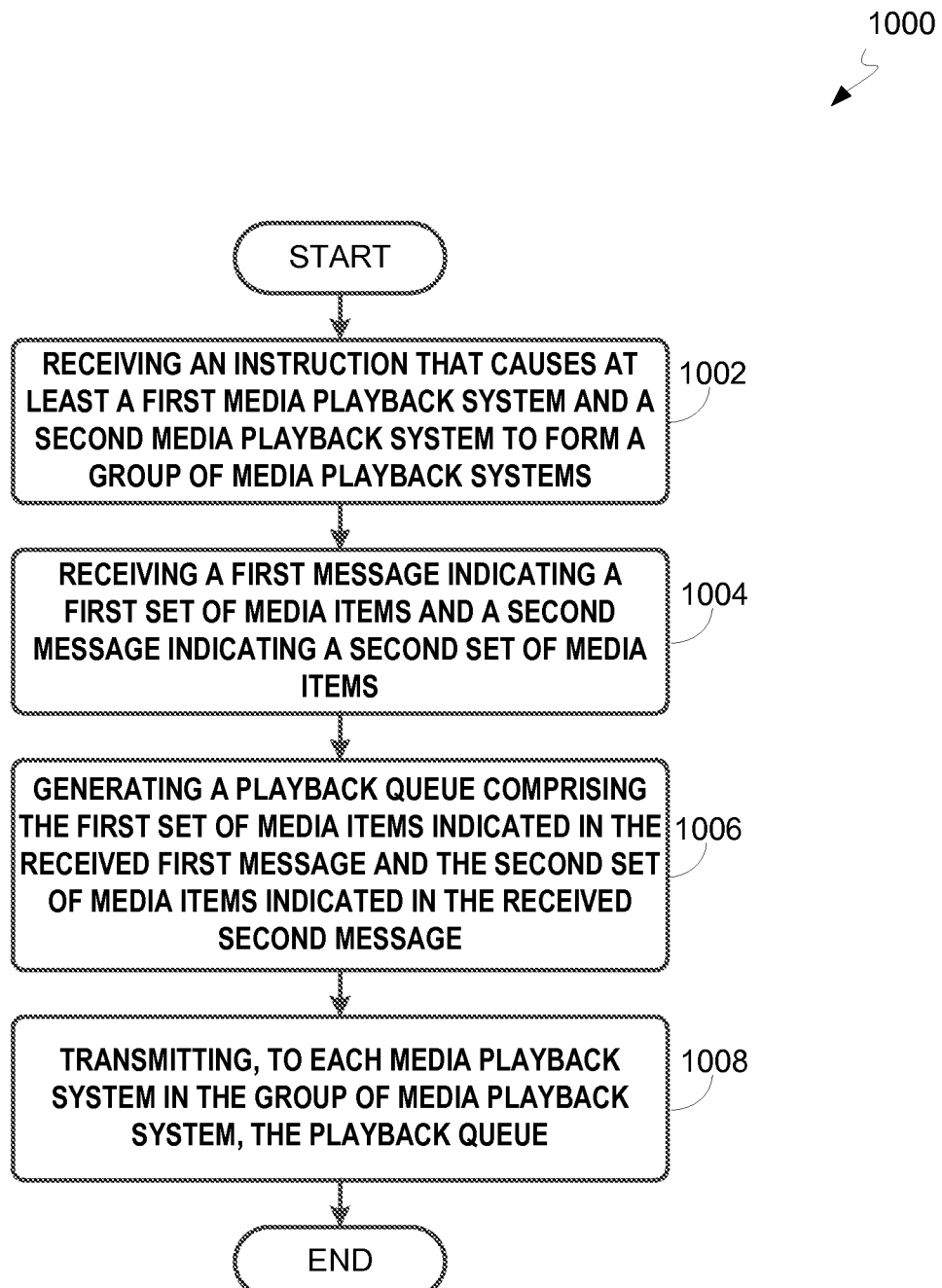
FIG. 10 shows a second example flow diagram to facilitate a social queue for use by a group of media playback systems.

Method 1000 shown in FIG. 10 presents an embodiment of a method that can be implemented within an operating environment involving, for example, the media playback system 100 of FIG. 1, one or more of the playback device 200 of FIG. 2, one or more of the control device 300 of FIG. 3, and one or more of computing device 500 of FIG. 5. Method 900 may include one or more operations, functions, or actions as illustrated by one or more of blocks 902-906. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

i. Receiving an Instruction that Causes at Least a First Media Playback System and a Second Media Playback System to Form a Group of Media Playback Systems.

At block 1002, the method involves receiving an instruction that causes at least a first media playback system and a second media playback system to form a group of media playback systems. A computing device, such as computing device 500 of FIG. 5 may receive the instruction over a network interface, such as network interface 506.

In some cases, a first computing device may receive the instruction that causes group formation from a second computing device involved in providing a cloud service. For instance, the second computing device may host a webpage that provides a user interface for selecting media playback systems to group. Alternatively, the second computing device may provide a "back-end" to a "front-end" that provides a user interface for selecting media playback systems to group. The "front-end" may be an application on a mobile device or a web site, among other examples. The "back-end" may receive indications of user input on the front-end that selects media playback systems to group. The "back-end" may then send the instruction that causes group formation to a first computing device.

In other cases, the first computing device may receive the instruction that causes group formation from a control device of a media playback system (e.g., the first media playback system). The control device may receive user input selecting one or more media playback systems to group (including, for example, the second media playback system). The control device may then sent the instruction to group to the first computing device.

ii. Receiving a First Message Indicating a First Set of Media Items and a Second Message Indicating a Second Set of Media Items.

At block 1004, the method involves receiving, from a third-party service provider, a first message indicating a first set of media items and a second message indicating a second set of media items. For instance, computing device 500 may receive the first message and the second message via network interface 506.

Computing device 500 may receive the first message from a first media playback system and the second message from a second media playback system. Within examples, computing device 500 may receive the first message from a controller device or a playback device. For instance, network interface 506 may connect over a network (e.g., the Internet) with respective network interfaces of devices of the first media playback system and the second media playback system. In one example, referring back to FIG. 7, computing device 500 may receive the first message and the second message from the first media playback system in office 710 and the second media playback system in office 730, respectively.

Alternatively, computing device 500 may receive the first message from a computing device associated with the first media playback system. For instance, the computing device 500 may receive the first message from the first user's smartphone or personal computer. The association may be a particular link between the computing device and the first media playback system that establishes that messages from the computing device may specify a first set of media items on behalf of the first media playback system. For instance, the computing device may have a memory with instructions stored thereon such that the computing device may be a control device of the first media playback system.

The first set of media items may take a variety of different forms. The media items may include, for example, any of the example audio content noted above. The first set of media items may be media items that are currently queued for playback on the first media playback system. As noted above, playback queue region 440 of controller interface 400 shown in FIG. 4 may include graphical representations of audio items in a queue of a media playback system. In other cases, the first set of media items may be media items in a queue that has been saved for later playback on the first media playback system. Yet, in other cases, the first set of items may be a playlist. In still other cases, the first set of media playback items may include any media items designated for inclusion in the social queue. For instance, the first media playback system may receive user input via a controller interface, such as controller interface 400 of FIG. 4. The user input may designate certain media items for inclusion in the social queue. The second set of media items may, for example, represent any of the above examples with respect to the second media playback system. Other examples are certainly possible as well.

iii. Generating A Playback Queue.

At block 1006, the method involves generating a playback queue comprising the first set of media items indicated in the received first message and the second set of media items indicated in the received second message. In particular, the generated playback queue may be a "social queue" that includes media items received from both the first media playback system and the second media playback system.

iv. Transmitting the Generated Playback Queue.

At block 1008, the method involves transmitting, to each media playback system in the group of media playback system, the generated playback queue. For instance, computing device 500 may transmit the generated playback queue to the first playback device in office 710 and the second playback device in office 730. In some cases, the computing device 500 may transmit the generated playback queue after receive a request for the generated playback queue (e.g., a request to playback media items in the generated playback queue).

In some cases, before transmitting the generated playback queue, computing device 500 may determine that at least one of the first media playback system and the second media playback system is in the group of media playback systems. The computing device 500 may then transmit the generated playback queue to each media playback system in the group of media playback systems.

In addition, for the methods 800, 900, and 1000 and other processes and methods disclosed herein, the flowcharts shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 500 and other processes and methods disclosed herein, each block in FIG. 5 may represent circuitry that is wired to perform the specific logical functions in the process.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

As indicated above, the present application involves a social queue for a group of media playback systems. In one aspect, a method is provided. The method involves receiving, from a first media playback system, a first message indicating a first set of media items and receiving, from a second media playback system, a second message indicating a second set of media items. The method also involves generating a playback queue comprising the first set of media items indicated in the first message and the second set of media items indicated in the second message. The method further involves transmitting, to at least one of the first media playback system and the second media playback system, the generated playback queue.

In another aspect, a device is provided. The device includes a processor, a network interface, a non-transitory computer-readable storage medium, and program logic stored on the non-transitory computer-readable medium and executable by the processor to perform functions. The functions include receiving, from a first media playback system, a first message indicating a first set of media items and receiving, from a second media playback system, a second message indicating a second set of media items. The functions also include generating a playback queue comprising the first set of media items indicated in the first message and the second set of media items indicated in the second message. The functions further include transmitting, to at least one of the first media playback system and the second media playback system, the generated playback queue.

In yet another aspect, a non-transitory computer readable memory is provided. The non-transitory computer readable memory has stored thereon instructions executable by a computing device to cause the computing device to perform functions. The functions include receiving, from a first media playback system, a first message indicating a first set of media items and receiving, from a second media playback system, a second message indicating a second set of media items. The functions also include generating a playback queue comprising the first set of media items indicated in the first message and the second set of media items indicated in the second message. The functions further include transmitting, to at least one of the first media playback system and the second media playback system, the generated playback queue.

In another aspect, a method is provided. The method involves receiving, at a computing device associated with a first media playback system, a command to form a group of media playback systems that comprises the first media playback system and at least one other media playback system. The method also involves receiving, at the computing device, an identification of at least one source of audio for playback by the group of media playback systems. The method further involve sending, by the computing device to the at least one other media playback system, a message comprising (i) an indication of the received command to form the group of media playback systems and (ii) an indication of the at least one source of audio for playback by the group of media playback systems.

In yet another aspect, a device is provided. The device includes a processor, a network interface, a non-transitory computer-readable storage medium, and program logic stored on the non-transitory computer-readable medium and executable by the processor to perform functions. The functions include receiving, at a computing device associated with a first media playback system, a command to form a group of media playback systems that comprises the first media playback system and at least one other media playback system. The function also include receiving, at the computing device, an identification of at least one source of audio for playback by the group of media playback systems. The functions further include sending, by the computing device to the at least one other media playback system, a message comprising (i) an indication of the received command to form the group of media playback systems and (ii)

an indication of the at least one source of audio for playback by the group of media playback systems.

In another aspect, a non-transitory computer readable memory is provided. The non-transitory computer readable memory has stored thereon instructions executable by a computing device to cause the computing device to perform functions. The functions include receiving, at a computing device associated with a first media playback system, a command to form a group of media playback systems that comprises the first media playback system and at least one other media playback system. The function also include receiving, at the computing device, an identification of at least one source of audio for playback by the group of media playback systems. The functions further include sending, by the computing device to the at least one other media playback system, a message comprising (i) an indication of the received command to form the group of media playback systems and (ii) an indication of the at least one source of audio for playback by the group of media playback systems.

In yet one aspect, a method is provided. The method involves receiving an instruction that causes at least a first media playback system and a second media playback system to form a group of media playback systems. The method also involves receiving, from a third-party service provider, a first message indicating a first set of media items and a second message indicating a second set of media items. The method further involves generating a playback queue comprising the first set of media items indicated in the received first message and the second set of media items indicated in the received second message. The method also involves transmitting, to each media playback system in the group of media playback system, the generated playback queue.

In another aspect, a device is provided. The device includes a processor, a network interface, a non-transitory computer-readable storage medium, and program logic stored on the non-transitory computer-readable medium and executable by the processor to perform functions. The functions include receiving an instruction that causes at least a first media playback system and a second media playback system to form a group of media playback systems. The functions also include receiving, from a third-party service provider, a first message indicating a first set of media items and a second message indicating a second set of media items. The functions further include generating a playback queue comprising the first set of media items indicated in the received first message and the second set of media items indicated in the received second message. The functions also include transmitting, to each media playback system in the group of media playback system, the generated playback queue.

In yet another aspect, a non-transitory computer readable memory is provided. The non-transitory computer readable memory has stored thereon instructions executable by a computing device to cause the computing device to perform functions. The functions include receiving an instruction that causes at least a first media playback system and a second media playback system to form a group of media playback systems. The functions also include receiving, from a third-party service provider, a first message indicating a first set of media items and a second message indicating a second set of media items. The functions further include generating a playback queue comprising the first set of media items indicated in the received first message and the second set of media items indicated in the received second message. The functions also include transmitting, to each media playback system in the group of media playback system, the generated playback queue.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

I claim:

1. A computing device that facilitates sharing of multimedia content with a social networking system, the computing device comprising:
one or more processors; and
a memory device in communication with the one or more processors, wherein the memory device stores instruction code that is executable by the one or more processors to cause the computing device to perform operations comprising:
displaying, via a user interface in communication with the one or more processors, a list of one or more media playback devices available to be added to a social networking group with an indication next to each item in the list to indicate whether a particular media playback device belongs to the group;
receiving, via the user interface, a selection of a first media playback device and a second media playback device to be associated with a particular social networking group, wherein the first media playback device is associated with a first playback queue that specifies a first set of media items associated with first media content that can be streamed from a first streaming service to the first media playback device; and
communicating, via a network interface in communication with the one or more processors, an indication to the social networking system that specifies the selection of the first media playback device and the second media playback device to be associated with the group, wherein in response, the social networking system communicates second media items associated with the first media items to a second playback queue associated with the second media playback device, wherein the second media items facilitate streaming of second media content associated with the first media content from a second streaming service to the second media playback device.

2. The computing device according to claim 1, wherein displaying the list of one or more media playback devices available to be added to the group comprises receiving the list of one or more media playback devices from the social networking system.

3. The computing device according to claim 1, wherein the instruction code is executable by the one or more processors to cause the computing device to perform further operations comprising:

receiving, from the social networking system, an indication associated with an invitation for a particular media playback device to join a social networking group; and displaying, via the user interface, a control that facilitates acceptance or rejection of the invitation for the media playback device to join the social networking group.

4. The computing device according to claim 3, wherein the social networking group is associated with one or more rules, wherein the instruction code is executable by the one or more processors to cause the computing device to perform further operations comprising:

responsive to receiving an acceptance indication via the user interface, communicating information indicative of whether the media playback device adheres to the one or more rules.

5. The computing device according to claim 4, wherein communicating information indicative of whether the media playback device adheres to the one or more rules further comprises:

communicating information indicative of whether the media playback device is capable of streaming media content from a particular streaming service.

6. The computing device according to claim 1, wherein the instruction code is executable by the one or more processors to cause the computing device to perform further operations comprising:

displaying, via the user interface, a group selection control that facilitates selecting one of a plurality of social networking groups; and responsive to selection of a particular group of the plurality of social networking groups, displaying a list of media playback devices associated with the group.

7. The computing device according to claim 1, wherein the instruction code is executable by the one or more processors to cause the computing device to perform further operations comprising:

displaying, via the user interface, a social networking playback queue selection control that facilitates selection of one of a plurality of social networking playback queues associated with a particular social networking group; and responsive to selection of a particular social networking playback queue, displaying, via the user interface, a list of playback items associated with the social networking playback queue.

8. The computing device according to claim 1, wherein the user interface facilitates modification of a social networking group playback queue, wherein the instruction code is executable by the one or more processors to cause the computing device to perform further operations comprising:

receiving, via the user interface, a request to modify the social networking group playback queue; and communicating the request to the social networking system, wherein in response, the social networking system modifies the social networking group playback queue according to the request and communicates the modified social networking group playback queue to at least one of the first media playback device and the second media playback device.

9. The computing device according to claim 8, wherein the user interface facilitates at least one of adding one or more media items to the social networking group playback queue, removing one or more media items from the social networking group playback queue, and ordering one or more media items within the social networking group playback queue.

10. The computing device according to claim 1, wherein the social networking system is implemented by a social networking service operating on a cloud computing platform.

11. A system that facilitates sharing of multimedia content, the system comprising:

a user interface;

network circuitry configured to facilitate communications with a social networking system;

one or more processors in communication with the user interface and the network circuitry; and a memory device in communication with the one or more processors, wherein the memory device stores instruction code that is executable by the one or more processors to cause the system to perform operations comprising:

displaying, via the user interface, a list of one or more media playback devices available to be added to a social networking group with an indication next to each item in the list to indicate whether a particular media playback device belongs to the group;

receiving, via the user interface, a selection of a first media playback device and a second media playback device to be associated with a particular social networking group, wherein the first media playback device is associated with a first playback queue that specifies a first set of media items associated with first media content that can be streamed from a first streaming service to the first media playback device; and communicating, via the network circuitry, an indication to the social networking system that specifies the selection of the first media playback device and the second media playback device to be associated with the group, wherein in response, the social networking system communicates second media items associated with the first media items to a second playback queue associated with the second media playback device, wherein the second media items facilitate streaming of second media content associated with the first media content from a second streaming service to the second media playback device.

12. The system according to claim 11, wherein displaying the list of one or more media playback devices available to be added to the group comprises receiving the list of one or more media playback devices from the social networking system.

13. The system according to claim 11, wherein the instruction code is executable by the one or more processors to cause the system to perform further operations comprising:

receiving, from the social networking system, an indication associated with an invitation for a particular media playback device to join a social networking group; and displaying, via the user interface, a control that facilitates acceptance or rejection of the invitation for the media playback device to join the social networking group.

14. The system according to claim 1, wherein the social networking group is associated with one or more rules, wherein the instruction code is executable by the one or more processors to cause the system to perform further operations comprising:

responsive to receiving an acceptance indication via the user interface, communicating information indicative of whether the media playback device adheres to the one or more rules.

15. The system according to claim 14, wherein communicating information indicative of whether the media playback device adheres to the one or more rules further comprises:

communicating information indicative of whether the media playback device is capable of streaming media content from a particular streaming service.

16. A tangible, non-transitory computer-readable medium having stored thereon instruction code that facilitates sharing of multimedia content with a social networking system, wherein the instruction code is executable by one or more processors to cause a computing system comprising the one or more processors to perform operations comprising:

displaying, via a user interface in communication with the one or more processors, a list of one or more media playback devices available to be added to a social networking group with an indication next to each item in the list to indicate whether a particular media playback device belongs to the group;

receiving, via the user interface, a selection of a first media playback device and a second media playback device to be associated with a particular social networking group, wherein the first media playback device is associated with a first playback queue that specifies a first set of media items associated with first media content that can be streamed from a first streaming service to the first media playback device; and communicating, via network circuitry in communication with the one or more processors, an indication to the social networking system that specifies the selection of the first media playback device and the second media playback device to be associated with the group, wherein in response, the social networking system communicates second media items associated with the first media items to a second playback queue associated with the second media playback device, wherein the second media items facilitate streaming of second media content associated with the first media content from a second streaming service to the second media playback device.

17. The tangible, non-transitory computer-readable medium according to claim 16, wherein displaying the list of one or more media playback devices available to be added to the group comprises receiving the list of one or more media playback devices from the social networking system.

18. The tangible, non-transitory computer-readable medium according to claim 16, wherein the instruction code is executable by the one or more processors to cause the computing system comprising the one or more processors to perform further operations comprising:

receiving, from the social networking system, an indication associated with an invitation for a particular media playback device to join a social networking group; and displaying, via the user interface, a control that facilitates acceptance or rejection of the invitation for the media playback device to join the social networking group.

19. The tangible, non-transitory computer-readable media according to claim 18, wherein the social networking group is associated with one or more rules, wherein the instruction code is executable by the one or more processors to cause the computing system comprising the one or more processors to perform further operations comprising:

responsive to receiving an acceptance indication via the user interface, communicating information indicative of whether the media playback device adheres to the one or more rules.

* * * * *